United States Patent
Nonaka et al.

(10) Patent No.: US 11,055,048 B2
(45) Date of Patent: *Jul. 6, 2021

(54) TECHNIQUES FOR ESTABLISHING POSITIONAL RELATIONSHIP(S) BETWEEN INFORMATION PROCESSING APPARATUSES

(71) Applicant: NINTENDO CO., LTD., Kyoto (JP)

(72) Inventors: Toyokazu Nonaka, Kyoto (JP); Toshiaki Suzuki, Kyoto (JP); Yoshiaki Onishi, Kyoto (JP); Osamu Tsuchihashi, Tokyo (JP); Shun Hakamada, Tokyo (JP)

(73) Assignee: Nintendo Co., Ltd., Kyoto (JP)

( * ) Notice: Subject to any disclaimer, the term of this patent is extended or adjusted under 35 U.S.C. 154(b) by 12 days.

This patent is subject to a terminal disclaimer.

(21) Appl. No.: 16/232,386

(22) Filed: Dec. 26, 2018

(65) Prior Publication Data
US 2019/0129678 A1    May 2, 2019

Related U.S. Application Data

(63) Continuation of application No. 15/486,740, filed on Apr. 13, 2017, now Pat. No. 10,203,925.

(30) Foreign Application Priority Data

Oct. 7, 2016  (JP) .................................. 2016-198772

(51) Int. Cl.
*G06F 3/14* (2006.01)
*G06F 3/0488* (2013.01)
(Continued)

(52) U.S. Cl.
CPC ........ *G06F 3/1423* (2013.01); *A63F 13/2145* (2014.09); *A63F 13/31* (2014.09);
(Continued)

(58) Field of Classification Search
CPC .. G06F 3/0486; G06F 3/04883; G06F 3/0488; G06F 3/1423; A63F 13/31
See application file for complete search history.

(56) References Cited

U.S. PATENT DOCUMENTS 6,545,669 B1 *   4/2003   Kinawi ................. G06F 3/0486
                                                         345/1.1
2008/0291173 A1   11/2008   Suzuki
(Continued)

FOREIGN PATENT DOCUMENTS

EP      2 369 46       4/2011
JP      2005-278938    10/2005
(Continued)

OTHER PUBLICATIONS

Office Action dated Mar. 31, 2019 in corresponding Japanese Application No. 2016-198772, 12 pages.
(Continued)

*Primary Examiner* — Steve Rowland
(74) *Attorney, Agent, or Firm* — Nixon & Vanderhye PC

(57) ABSTRACT

This game system is provided with a plurality of information processing apparatuses that are capable of communicating with each other and include at least a first information processing apparatus and a second information processing apparatus, and a control unit that controls the plurality of information processing apparatuses. The first information processing apparatus includes a first display unit and a first touch panel that detects contact on the first display unit, and the second information processing apparatus includes a second display unit and a second touch panel that detects contact on the second display unit.

26 Claims, 26 Drawing Sheets

(51) Int. Cl.
*A63F 13/426* (2014.01)
*A63F 13/2145* (2014.01)
*A63F 13/31* (2014.01)
*A63F 13/428* (2014.01)

(52) U.S. Cl.
CPC .......... *A63F 13/426* (2014.09); *A63F 13/428* (2014.09); *G06F 3/0488* (2013.01); *G06F 3/04883* (2013.01)

(56) References Cited

U.S. PATENT DOCUMENTS

| | | | |
|---|---|---|---|
| 2009/0140986 A1* | 6/2009 | Karkkainen | G06F 3/0486 345/173 |
| 2010/0309158 A1 | 12/2010 | Iwayama et al. | |
| 2011/0109526 A1 | 5/2011 | Bauza et al. | |
| 2011/0209104 A1* | 8/2011 | Hinckley | G06F 3/0416 715/863 |
| 2011/0234515 A1 | 9/2011 | Kamijima | |
| 2012/0139946 A1 | 6/2012 | Tang | |
| 2012/0249443 A1* | 10/2012 | Anderson | A63F 13/06 345/173 |
| 2013/0044341 A1* | 2/2013 | Uchino | H04N 1/00307 358/1.13 |
| 2013/0120304 A1 | 5/2013 | Miyahara | |
| 2013/0159942 A1 | 6/2013 | Mizunuma et al. | |
| 2013/0194278 A1* | 8/2013 | Zajac, III | A63F 13/10 345/473 |
| 2013/0290876 A1* | 10/2013 | Anderson | G06T 19/006 715/761 |
| 2013/0321340 A1* | 12/2013 | Seo | H04M 1/0214 345/174 |
| 2014/0125697 A1 | 5/2014 | Suito | |
| 2014/0289362 A1* | 9/2014 | Itoh | H04W 4/50 709/217 |
| 2015/0180912 A1* | 6/2015 | Dufour | G06F 3/0486 715/753 |
| 2018/0101350 A1 | 4/2018 | Nonaka | |
| 2019/0037611 A1* | 1/2019 | Renn | G06F 3/0486 |

FOREIGN PATENT DOCUMENTS

| | | |
|---|---|---|
| JP | 2008 203649 | 9/2008 |
| JP | 2010-286911 | 12/2010 |
| JP | 2011-048610 | 3/2011 |
| JP | 2011-248465 | 12/2011 |
| JP | 2013-125373 | 6/2013 |
| JP | 2013 196142 | 9/2013 |
| JP | 2013-200855 | 10/2013 |
| JP | 2013-210730 | 10/2013 |
| JP | 2013-218468 | 10/2013 |
| JP | 2013 246724 | 12/2013 |
| JP | 2014-123316 | 7/2014 |
| JP | 2015-212829 | 11/2015 |
| JP | 2016-051110 | 4/2016 |
| WO | 2012/176926 | 12/2012 |

OTHER PUBLICATIONS

Extended European Search Report dated Nov. 2, 2017 for EPO Application No. 17165760.4-1906 (12 pages).
Gonzalo Ramos et al., "Synchronous Gestures in Multi-Display Environments," retrieved Jul. 13, 2018, 105 pages.
Office Action dated Oct. 12, 2018 in related Japanese Application No. 2016-198772, 11 pages.

* cited by examiner

TECHNIQUES FOR ESTABLISHING POSITIONAL RELATIONSHIP(S) BETWEEN INFORMATION PROCESSING APPARATUSES

CROSS-REFERENCE TO RELATED APPLICATIONS

This application is a continuation of application Ser. No. 15/486,740 filed Apr. 13, 2017, which claims priority to JP Patent Application No. 2016-198772 filed Oct. 7, 2016, the entire contents each of which is hereby incorporated by reference in this application.

TECHNICAL FIELD

The present invention relates to a game system, a game method, an information processing apparatus, and a game program.

BACKGROUND ART

Heretofore, various types of game apparatuses provided with two screens have been proposed. For example, in a game apparatus described in Patent Literature 1, two LCD screens, namely, a first display unit and a second display unit, are arranged across a gap. In this game apparatus, one game space can be displayed using two display units. For example, an object displayed on the first display unit can be displayed so as to move to the second display unit across the gap between the first display unit and the second display unit.

CITATION LIST

Patent Literature

Patent Literature 1: JP 2005-278938A

SUMMARY OF INVENTION

However, with game apparatus described in Patent Literature 1, there is a problem in that since the two display units are fixed, the degree of freedom with which the game space can be set is low. That is, there is a problem that since the positional relationship of the two display units is fixed, the images that are displayed are also subject to restrictions. Note that such a problem is not limited to game apparatuses and can occur in any apparatus that uses a plurality of display units in combination. The present invention was made in order to solve this problem, and aims to provide a game system, a game method, an information processing apparatus and a game program that are able to use a plurality of display units in combination with a high degree of freedom.

A game system according to a first aspect is provided with a plurality of information processing apparatuses configured to communicate with each other and include at least a first information processing apparatus and a second information processing apparatus, and a control unit configured to control the plurality of information processing apparatuses. The first information processing apparatus includes a first display unit and a first touch panel configured to detect contact on the first display unit, and the second information processing apparatus includes a second display unit and a second touch panel configured to detect contact on the second display unit. When a slide input from a first position on the first touch panel toward a second position on the second touch panel is detected, based on touch information detected by the first touch panel and the second touch panel, the control unit sets a positional relationship of the first display unit and the second display unit, based on a first slide input on the first touch panel and a second slide input on the second touch panel, out of the slide input from the first position toward the second position, performs game processing that is based on the positional relationship, and causes at least one of the first display unit and the second display unit to perform display that is based on the game processing.

According to this configuration, display with a high degree of freedom can be performed using the display unit of the first information processing apparatus and the display unit of the second information processing apparatus. That is, the positions of these display units are not fixed, enabling the two display units to freely arranged, by moving the information processing apparatuses. In order to set the positional relationship of such display units, in the present invention, a slide input from a first position on the touch panel of the first information processing apparatus toward a second position of the touch panel of the second information processing apparatus is performed. As a result of this slide input, a first slide input on the touch panel of the first information processing apparatus and a second slide input on the touch panel of the second information processing apparatus are detected and the positional relationship of the two display units can be set based on the first and second slide inputs. Accordingly, game processing can be performed from the set positional relationship and display based on this game processing can be performed on the two display units, irrespective of the positions in which the two display units are placed. Therefore, display with a high degree of freedom can be performed using the two display units.

A game system according to a second aspect is the game system according to the first aspect in which the control unit calculates a first vector corresponding to the first slide input on the first touch panel, calculates a second vector corresponding to the second slide input on the second touch panel, and sets the positional relationship, based on the first vector and the second vector.

A game system according to a third aspect is the game system according to the second aspect in which the control unit sets the positional relationship as being such that the first vector and the second vector are arranged on a same straight line, sets a prescribed virtual space, sets a first display range and a second display range that are partial ranges within the virtual space, in correspondence with the positional relationship, and configures settings such that the first display range of the virtual space is displayed on the first display unit and the second display range of the virtual space is displayed on the second display unit.

There are various methods for setting the positional relationship, and, for example, as mentioned above, a virtual space can be set and a range of a portion of this virtual space can be set so as to be displayed on the two display units. The positional relationship can then be set, such that the above-mentioned two vectors are arranged side-by-side on the same straight line within this virtual space. The virtual space can thereby be displayed on the two display units, so as to correspond precisely to the positions in which the two display units are placed. Note that the two vectors are preferably on exactly the same straight line, but need not be on strictly the same straight line, and may be slightly shifted from the straight line as long as the positional relationship that is set is not greatly shifted from the actual positions of the two display units.

A game system according to a fourth aspect is the game system according to the second aspect in which the control unit calculates a distance between an end point of the first vector and a start point of the second vector, based on a time period between the first slide input and the second slide input and a speed of the slide input, sets the positional relationship as having a space of a prescribed interval that is based on the distance between the first display unit and the second display unit, sets a prescribed virtual space, sets a first display range and a second display range that are partial ranges within the virtual space, in correspondence with the positional relationship, and configures settings such that the first display range of the virtual space is displayed on the first display unit and the second display range of the virtual space is displayed on the second display unit.

According to this configuration, the distance between the end point of the first vector and the start point of the second vector is calculated based on the speed of the slide input, thus enabling the virtual space that provides a space between the two display units according to this distance to be displayed by these display units. Accordingly, the degree of freedom of display of the virtual space that combines the two display units can be further enhanced. Note that various settings, such as the speed of a portion of each slide, can be used for the "speed of the slide input", apart from being able to use the average speed of the first slide input, the average speed of the second slide input, or the average speed of the first and second slide inputs.

A game system according to a fifth aspect is the game system according to any of the first to fourth aspects, in which at least one of the first information processing apparatus and the second information processing apparatus includes a sensor for detecting an inclination of the apparatus, and the control unit calculates the inclination of the apparatus that includes the sensor, based on output from the sensor, sets a state of intersection of a display surface of the first display unit and a display surface of the second display unit, based on the inclination, and causes at least one of the first display unit and the second display unit to perform display that depends on the state of intersection.

According to this configuration, the inclination of the information processing apparatuses can be calculated using the output from a sensor, thus enabling the state of intersection of the two information processing apparatuses to be set. Display that depends on the state of intersection of the two information processing apparatuses can thereby be performed on the display units, thus enabling the degree of freedom of display of the virtual space that combines the two display units to be further enhanced. Note that the "state of intersection" indicates a state in which the display surfaces of the two display units intersect at a predetermined angle and posture, and indicates a state in which the display surfaces of the two display units are not in roughly the same plane.

A game system according to a sixth aspect is the game system according to any of the first to fifth aspects, in which the plurality of information processing apparatuses include a third information processing apparatus that has a third display unit, and the control unit sets a positional relationship of the first display unit and the third display unit or a positional relationship of the second display unit and the third display unit, and causes at least one of the first display unit, the second display unit and the third display unit to perform display that depends on at least one of the positional relationships.

According to this configuration, the positional relationship of three display units of three information processing apparatuses can be set. Display that combines three display units thereby becomes possible, enabling the degree of freedom of display to be further enhanced. Note that four or more information processing apparatuses can also be combined.

A game system according to a seventh aspect is the game system according to any of the first to sixth aspects, in which the first information processing apparatus, when a slide input terminating at a periphery of the first touch panel is detected, determines the first information processing apparatus to be a base unit and performs communication with an extension unit, the second information processing apparatus, when a slide input terminating other than at a periphery of the second touch panel is detected, determines the second information processing apparatus to be an extension unit and performs communication with a base unit, and the first information processing apparatus and the second information processing apparatus enter a mutually communicable state, in a case where the first information processing apparatus is determined to be the base unit and the second information processing apparatus is determined to be the extension unit, and an orientation of the first slide input on the first touch panel coincides with an orientation of the second slide input on the second touch panel.

According to this configuration, two information processing apparatuses can be brought into a mutually communicable state (e.g., pairing), by a slide input spanning from the first information processing apparatus to the second information processing apparatus. Therefore, pairing can be easily performed, for example. However, pairing is not possible unless the orientations of the slide inputs relative to the touch panels of the information processing apparatuses coincide, thus enabling unintentional pairing to be eliminated. Note that "the periphery of the touch panel" is not only the periphery in a strict sense but may also be a peripheral region having a predetermined width. Apart from being able to arbitrarily set the position or region that is to be the periphery, the peripheral region in which a touch can be detected may be predetermined, depending on the characteristics of the touch panels.

A game method according to an eighth aspect is a game method using a first information processing apparatus having a first display unit and a first touch panel configured to detect contact on the first display unit, and a second information processing apparatus having a second display unit and a second touch panel that detects contact on the second display unit and capable of communicating with the first information processing apparatus, the method comprising: detecting a slide input from a first position on the first touch panel toward a second position on the second touch panel, based on touch information detected by the first touch panel and the second touch panel, setting a positional relationship of the first display unit and the second display unit, based on a first slide input on the first touch panel and a second slide input on the second touch panel, out of the slide input from the first position toward the second position, performing game processing that is based on the positional relationship, and causing at least one of the first display unit and the second display unit to perform display that is based on the game processing.

An information processing apparatus according to a ninth aspect is an information processing apparatus configured to communicate with other apparatus that has a display unit and a touch panel configured to detect contact, and including a display unit, a touch panel configured to detect contact on the display unit, a control unit, and a communication unit. When a slide input from a first position on the touch panel of the information processing apparatus toward a second position on the touch panel of the other apparatus is detected, based on touch information detected by the touch panel of the information processing apparatus and the touch panel of the other apparatus, the control unit acquires, from the other apparatus via the communication unit, a second slide input on the touch panel of the other apparatus, out of the slide input from the first position toward the second position, sets a positional relationship of the display unit of the information processing apparatus and the display unit of the other apparatus, based on the second slide input and a first slide input on the touch panel of the information processing apparatus, out of the slide input, performs game processing that is based on the positional relationship, and causes at least one of the display unit of the information processing apparatus and the display unit of the other apparatus to perform display that is based on the game processing.

An information processing apparatus according to a tenth aspect is an information processing apparatus configured to communicate with other apparatus that has a display unit and a touch panel configured to detect contact, and including a display unit, a touch panel configured to detect contact on the display unit, a control unit, and a communication unit. When a slide input from a first position on the touch panel of the other apparatus toward a second position on the touch panel of the information processing apparatus is detected, based on touch information detected by the touch panel of the other apparatus and the touch panel of the information processing apparatus, the control unit acquires, from the other apparatus via the communication unit, a first slide input on the touch panel of the other apparatus, out of the slide input from the first position toward the second position, sets a positional relationship of the display unit of the information processing apparatus and the display unit of the other apparatus, based on the first slide input and a second slide input on the touch panel of the information processing apparatus, out of the slide input, performs game processing that is based on the positional relationship, and causes at least one of the display unit of the information processing apparatus and the display unit of the other apparatus to perform display that is based on the game processing.

A Non-transitory computer readable storage medium according to an eleventh aspect is a medium for storing a game program for causing a computer of an information processing apparatus having a display unit and a touch panel configured to detect contact, and capable of communicating with other apparatus having a display unit and a touch panel configured to detect contact to execute the steps of, when a slide input from a first position on the touch panel of the information processing apparatus toward a second position on the touch panel of the other apparatus is detected, based on touch information detected by the touch panel of the information processing apparatus and the touch panel of the other apparatus, acquiring, from the other apparatus, a second slide input on the touch panel of the other apparatus, out of the slide input from the first position toward the second position, setting a positional relationship of the display unit of the information processing apparatus and the display unit of the other apparatus, based on the second slide input and a first slide input on the touch panel of the information processing apparatus, out of the slide input, performing game processing that is based on the positional relationship, and causing at least one of the display unit of the information processing apparatus and the display unit of the other apparatus to perform display that is based on the game processing.

A Non-transitory computer readable storage medium according to an twelfth is a medium for storing a game program for causing a computer of an information processing apparatus having a display unit and a touch panel configured to detect contact, and capable of communicating with other apparatus having a display unit and a touch panel configured to detect contact to execute the steps of, when a slide input from a first position on the touch panel of the other apparatus toward a second position on the touch panel of the information processing apparatus is detected, based on touch information detected by the touch panel of the other apparatus and the touch panel of the information processing apparatus, acquiring, from the other apparatus, a first slide input on the touch panel of the other apparatus, out of the slide input from the first position toward the second position, setting a positional relationship of the display unit of the information processing apparatus and the display unit of the other apparatus, based on the first slide input and a second slide input on the touch panel of the information processing apparatus, out of the slide input, performing game processing that is based on the positional relationship, and causing at least one of the display unit of the information processing apparatus and the display unit of the other apparatus to perform display that is based on the game processing.

According to the above game system, a plurality of display units can be used in combination with a high degree of freedom.

DESCRIPTION OF EMBODIMENTS

An embodiment of a game system according to the present invention will be described below, with reference to the drawings. A game apparatus that is included in this game system corresponds to an information processing apparatus of the present invention. Hereinafter, after first giving an outline of the game apparatus, a usage method (game method) of the game system will be described.

1. Game Apparatus 1-1. Outer Appearance of Game Apparatus

Figure 1:
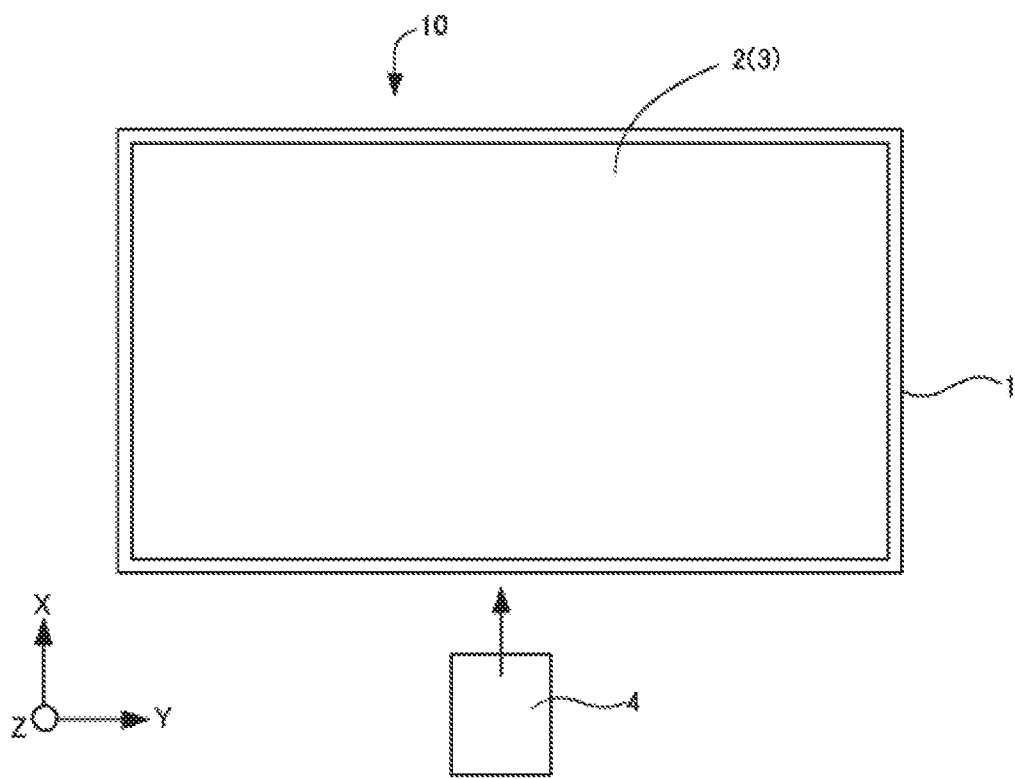
FIG. 1 is a plan view showing an example in which an information processing apparatus is applied to a game apparatus according to the present invention.

First, the outer appearance of the game apparatus will be described, with reference to FIG. 1. FIG. 1 is a perspective diagram showing the outer appearance of the game apparatus. As shown in FIG. 1, this game apparatus 10 is provided with a flat casing 1 that is rectangular in plan view, and a rectangular LCD (Liquid Crystal Display) 2 is provided spanning substantially the entire surface of the main surface of this casing 1. A touch panel 3 having substantially the same shape as this LCD 2 is provided spanning substantially the entire surface of the LCD 2. The touch panel 3 that is used here is not particularly limited and various touch panels can be employed, such as a capacitive-type touch panel, a resistive-type touch panel, a planar scatter detection-type touch panel or an ultrasonic-type touch panel, and the touch panel 3 can be touched using a touch pen, apart from being touched with the player's finger. Also, this touch panel 3 may be a single touch panel or a multi touch panel. Furthermore, although the resolution (detection accuracy) that is utilized for this touch panel 3 is preferably comparable to the resolution of the LCD 2, the resolutions of the touch panel 3 and the LCD 2 need not necessarily coincide. Note that although this LCD 2 corresponds to a display unit of the present invention, the present invention is not limited to an LCD as long as images can be displayed.

Also, such a touch panel 3 may not be able to detect a touch precisely out to a peripheral portion, depending on the characteristics of the touch panel. In that case, a configuration may be adopted in which detected data is not used, even when a touch is made, with regard to a predetermined range of the periphery of the touch panel 3.

In addition, an insertion opening (illustration omitted) for inserting an external storage medium 4 is provided in the casing 1, and a connector (illustration omitted) for electrically connecting detachably to the external storage medium 4 is provided inside the insertion opening. Also, various devices such as a camera, a speaker and a microphone can also be provided if needed.

1-2. Internal Configuration of Game Apparatus

Figure 2:
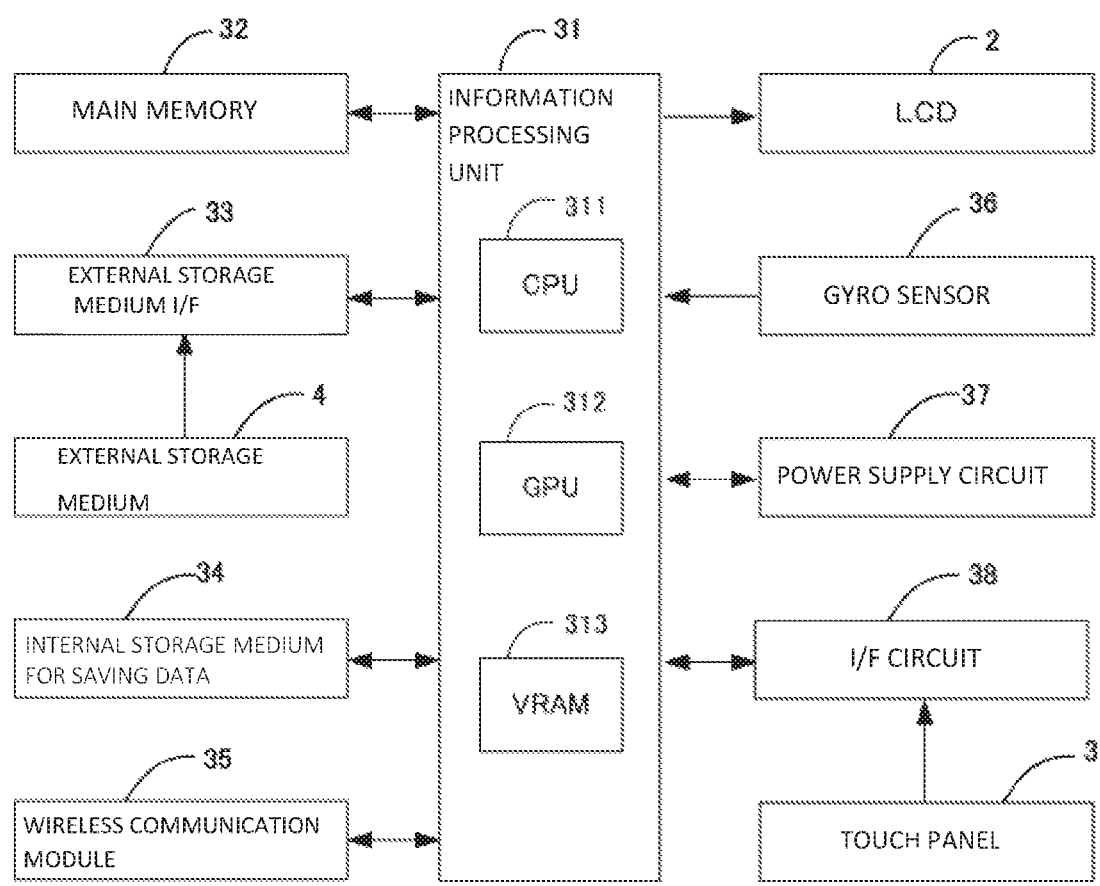
FIG. 2 is a block diagram showing an internal configuration of the game apparatus shown in FIG. 1.

Next, the internal configuration of this game apparatus 10 will be described, with reference to FIG. 2. FIG. 2 is a block diagram showing the internal configuration of the game apparatus 10. As shown in FIG. 2, this game apparatus 10 is provided with an information processing unit (control unit) 31 in addition to the configuration shown in FIG. 1, and a main memory 32, an external storage medium interface (external storage medium I/F) 33, an internal storage medium 34 for saving data, a wireless communication module (communication unit) 35, an inertial sensor 36, a power supply circuit 37, an interface circuit (I/F circuit) 38 and the like are connected to this information processing unit 31. These electronic components are mounted on an electronic circuit board and housed within the casing 1. The abovementioned LCD 2 is also connected to the information processing unit 31.

The information processing unit 31 is provided with a CPU (Central Processing Unit) 311 for executing a predetermined program, a GPU (Graphics Processing Unit) 312 that performs image processing, a VRAM (Video RAM) 313 and the like. In the present embodiment, the predetermined program is stored in a memory within the game apparatus 10 (e.g., external storage medium 4 connected to external storage medium I/F 33 and internal storage medium 34 for saving data). The CPU 311 of the information processing unit 31, by executing the predetermined program, executes processing for controlling positional relationships and game processing relating to games which will be discussed later, as well as various types of processing that are based on game processing.

Also, in the information processing unit 31, the GPU 312 generates an image according to commands from the CPU 311, and renders the image in the VRAM 313. The GPU 312 then outputs the image rendered in the VRAM 313 to the LCD 2 connected to the information processing unit 31, and the image is displayed on the LCD 2.

The main memory 32 is a volatile storage means that is used as a buffer area and a work area of the CPU 311. That is, the main memory 32 temporarily stores various types of data to be used in the above processing, and temporarily stores programs that are acquired from outside (external storage medium 4, other devices, etc.).

The external storage medium I/F 33 is an interface for detachably connecting the external storage medium 4. The external storage medium 4 is a nonvolatile storage means for storing programs that are executed by the information processing unit 31, and is, for example, constituted by a read-only semiconductor memory. When the external storage medium 4 is connected to the external storage medium I/F 33, the information processing unit 31 is able to read the programs stored in the external storage medium 4. Predetermined processing is then performed as a result of the information processing unit 31 executing the read programs.

The internal storage medium 34 for data saving is constituted by a readable/writable nonvolatile memory (e.g., NAND flash memory), and is used in order to store predetermined data. For example, data and programs downloaded through wireless communication via the wireless communication module 35 are stored in the internal storage medium 34 for data saving.

The wireless communication module 35 is, for example, a communication module that has received WiFi certification, and has a function of connecting to a wireless LAN, using a method based on the standards IEEE 802.11a/b/g/n/ac, for example. The information processing unit 31 is able to transmit and receive data with another game apparatus or to transmit and receive data with another device via the Internet, as will be discussed later, using the wireless communication module 35.

Also, the wireless communication module 35 is provided with a function of performing wireless communication, in the case of playing a game among a plurality of game apparatuses.

The inertial sensor 36 detects the angular velocities about three axes (XYZ axes in the present embodiment), and at least one gyro sensor, acceleration sensor or the like, for example, can be used as the inertial sensor 36. In the case of using a gyro sensor, the inertial sensor 36 detects the angular velocity about each axis, where the short-side direction, the long-side direction, and the thickness direction (direction perpendicular to main surface) of the casing 1 shown in FIG. 1 are respectively the X-axis, the Y-axis and the Z-axis, for example. Note that this gyro sensor need only be able to detects angular velocities about three axes, and any number and combination of the gyro sensor that is used is possible. For example, the gyro sensor may be a three-axis gyro sensor, or a component that combines a two-axis gyro sensor and a single axis gyro sensor to detect the angular velocities about three axes. Also, a plurality of acceleration sensors may be combined to calculate the posture about the three axes with the detected acceleration as gravitational acceleration. In this way, data representing the angular velocity detected by an inertial sensor 36 such as a gyro sensor or an acceleration sensor is transmitted to the information processing unit 31, which calculates the inclination about the XYZ axes of the casing 1.

The power supply circuit 37 controls power from a power supply (illustration omitted) of the game apparatus 10, and supplies power to each component of the game apparatus 10.

The I/F circuit 38 has the touch panel 3 connected thereto. Specifically, the I/F circuit 38 is provided with a touch panel control circuit that controls the touch panel 3, and this touch panel control circuit generates touch position data of a predetermined format based on signals from the touch panel 3, and outputs the touch position data to the information processing unit 31. The touch position data indicates the coordinates (touch information) of the position where input was performed on the input screen of the touch panel 3. Note that the touch panel control circuit performs reading of signals from the touch panel 3 and generation of touch position data at a rate of once every predetermined time period. The information processing unit 31 is then informed of the position where input was performed on the touch panel 3, by acquiring the touch position data.

2. Exemplary Use of Game System

Next, exemplary use of the game system including a plurality of game apparatuses constituted as abovementioned will be described. In the game system according to the present embodiment, a game is played using a plurality of the abovementioned game apparatus.

2-1. Example of Data Used in Game Processing

Figure 3:
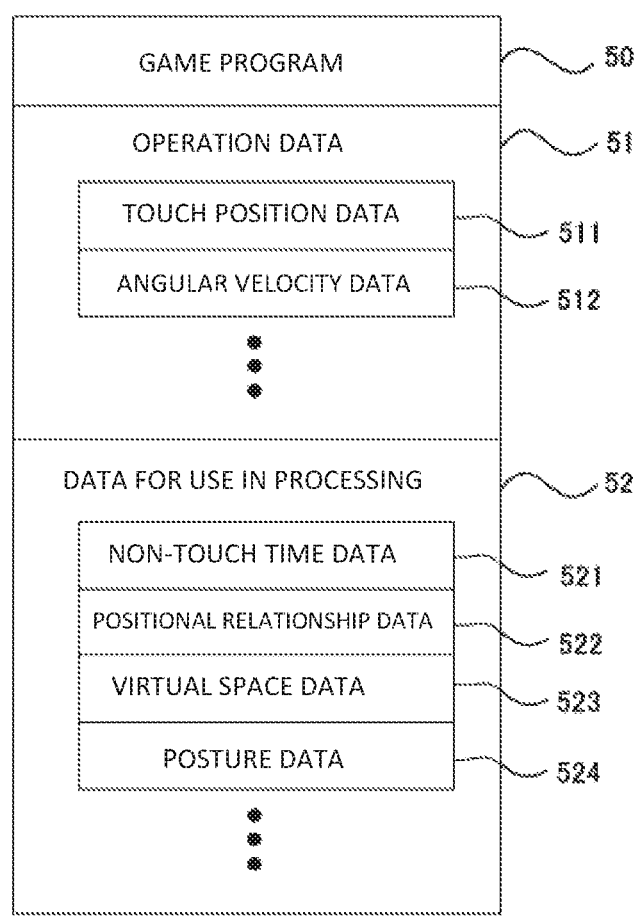
FIG. 3 is a diagram showing various types of data that are used in game processing.

First, the various types of data that are used in game processing that is executed in the game system will be described. FIG. 3 is a diagram showing various types of data that are used in game processing. As shown in FIG. 3, a game program 50, operation data 51, and data 52 for use in processing are stored in the main memory 32 of each game apparatus 10. Of these, the operation data 51 and the data 52 for use in processing are mutually referred to by communication between the game apparatuses 10, and data generated by one of the game apparatuses 10 is transmitted to the other game apparatuses 10 and saved. Specifically, communication is performed using a frame synchronization method which will be discussed later, and data is mutually referred to. Note that, apart from the data shown in FIG. 3, data required for the game, such as image data of various types of objects that appear in the game and audio data that is used in the game, is stored in the main memory 32.

The game program 50 is read in part or in whole from the external storage medium 4 or the internal storage medium 34 for saving data at an appropriate timing after each game apparatus 10 is powered on, and stored in the main memory. Also, a portion included in the game program 50 (e.g., program for calculating the posture of the casing 1), may be stored in advance within the game apparatus 10.

The operation data 51 is data representing the operations that a player performs on each game apparatus 10. The operation data 51 includes touch position data 511 and angular velocity data 512.

The touch position data 511 is data representing the position (touch position) where an input was performed on the touch panel 3. In the present embodiment, the touch position data 511 is a coordinate value of a two-dimensional coordinate system for indicating positions on an input screen, and, in particular, represents a coordinate value for every frame. Note that in the case where the touch panel 3 is a multi-touch panel, the touch position data 511 may also represent a plurality of touch positions.

The angular velocity data 512 is data representing the angular velocity detected by the inertial sensor 36. In the present embodiment, the angular velocity data 512 represents the angular velocity about each of the three axes XYZ shown in FIG. 1, but need only represent the angular velocity about one or more arbitrary axes.

Note that the operation data 51 need only represent operations and inputs performed on the game apparatus 10, and need not necessarily includes all of the above data 511 and 512. Also, in the case where the game apparatus 10 has other input means such as a camera and a microphone, for example, the operation data 51 may include data representing operations performed on these other input means. Data from an external operation apparatus may also be included.

The data 52 for use in processing is data that is used in game processing which will be discussed later. The data 52 for use in processing includes non-touch time data 521, positional relationship data 522, virtual space data 523 and posture data 524. Note that, apart from the data shown in FIG. 3, the data 52 for use in processing includes various types of data that are used in game processing, such as data representing various types of parameters that are set for various types of objects that appear in the game.

The non-touch time data 521 is data indicating the time from when the player's finger leaves one touch panel until when the player's finger touches the other touch panel, when the player performs a slide input spanning the two touch panels, as will be discussed later, and is calculated based on the abovementioned touch position data 511. In the present embodiment, the non-touch time data 521 can be represented with the number of frames, but may be any data equivalent to time.

The positional relationship data 522 is data showing vectors corresponding to the respective slide inputs performed on the touch panels 3 that are calculated based on the abovementioned touch position data 511, and the positional relationship of both touch panels that is calculated from the vectors and the non-touch time data 521. For example, the coordinates in the global coordinate space of each LCD 2 are included. The data of computational processes performed up until these global coordinates are calculated, such as the coordinates of the other touch panel in the local coordinate space of one touch panel, for example, are also included. Calculation of this positional relationship data 522 will be described in detail later.

The virtual space data 523 is data that, in the case where a space greater than or equal to a predetermined distance is formed between the two touch panels 3A and 3B, sets this space as a virtual space, and is used in a game space (virtual space) which will be discussed later. The virtual space data 523 is used to calculate the distance between both touch panels 3A and 3B based on the abovementioned non-touch time data 521, and to set the distance of the virtual space between the images that are displayed on both touch panels 3A and 3B based on the calculated distance. The shape of this virtual space is also set, depending on the type of game. For example, in a hockey game that is discussed later, walls for the ball to rebound off are set in the virtual space.

The posture data 524 is data representing the three-dimensional posture (inclination) of the game apparatus 10 that is calculated based on the angular velocity data 512. The posture of the game apparatus 10 may, for example, be expressed by a rotation matrix representing rotation from a predetermined reference posture to the current posture of the casing 1 or be expressed by a three-dimensional vector or three angles.

Apart from the data 521 to 524, various types of data required in game processing are stored in the main memory 32.

Also, in the present embodiment, the processing of each step of a flowchart that will be discussed below is described as being executed by the CPU 311, but a configuration may be adopted in which the processing of some of the steps in this flowchart are executed by a dedicated communication circuit or a processor other than the CPU 311.

2-2. Example of Game Processing

Next, an example of game processing will be described. In the present embodiment, first, the positional relationship of the plurality of game apparatuses 10 is set, and a game is played based on this positional relationship. In view of this, hereinafter, the method of setting the positional relationship of a plurality of game apparatuses will be described, after which a number of examples of games that use this positional relationship will be described.

2-2-1. Example of Setting Positional Relationship

Figure 4:
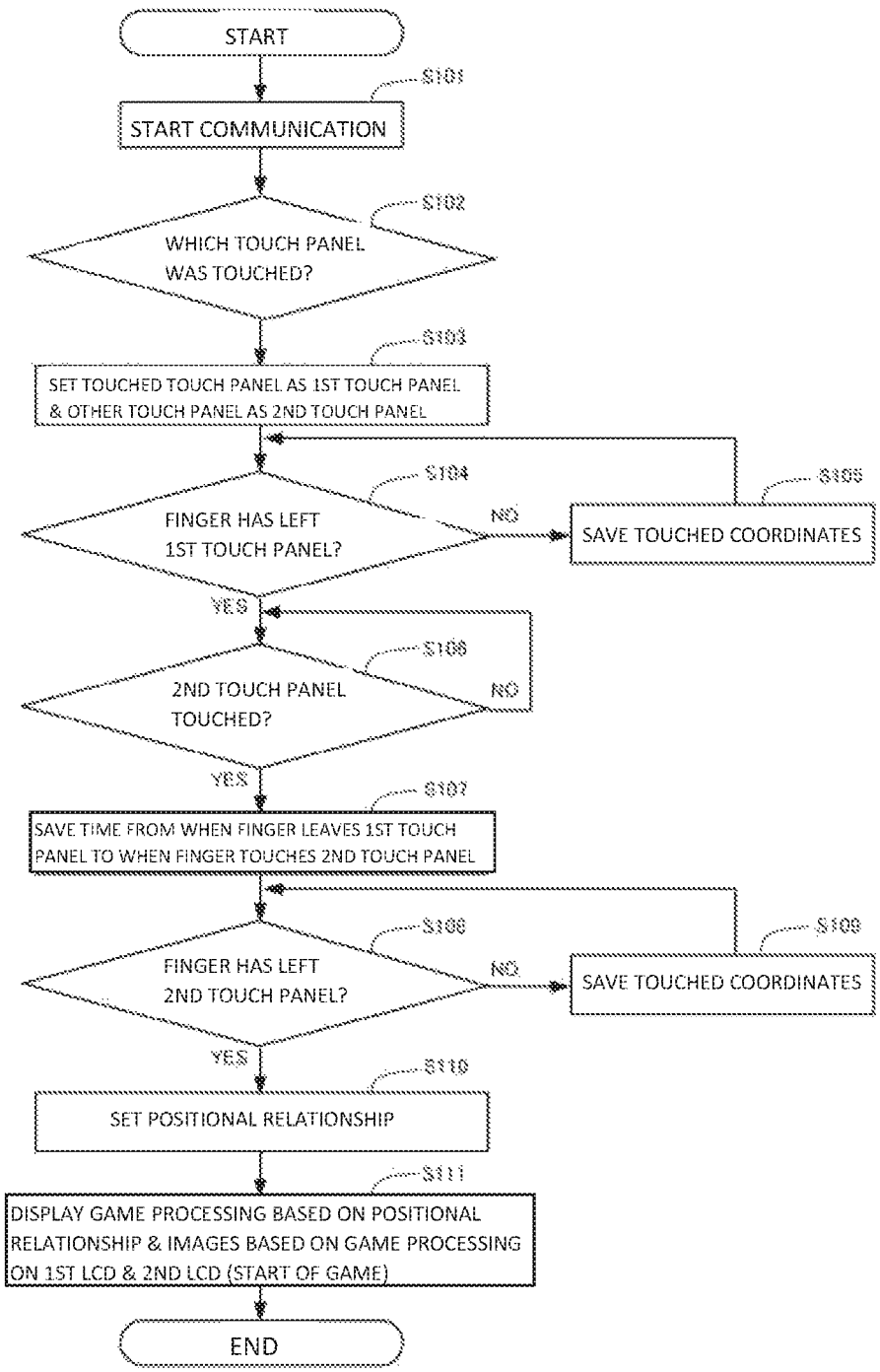
FIG. 4 is a flowchart relating to processing for setting a positional relationship.
Figure 5:
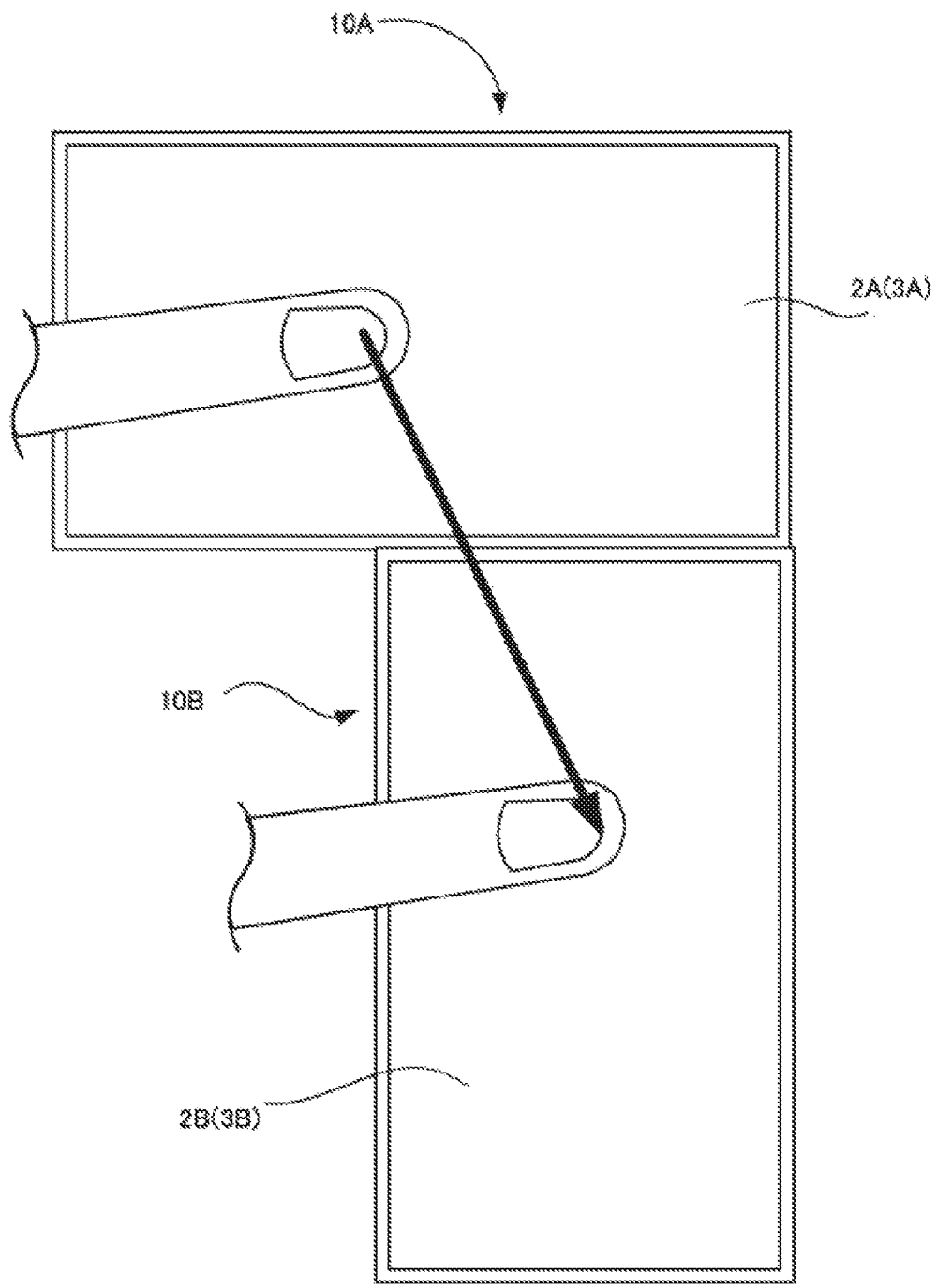
FIG. 5 is a plan view showing a process of setting the positional relationship with two game apparatuses.
Figure 6:
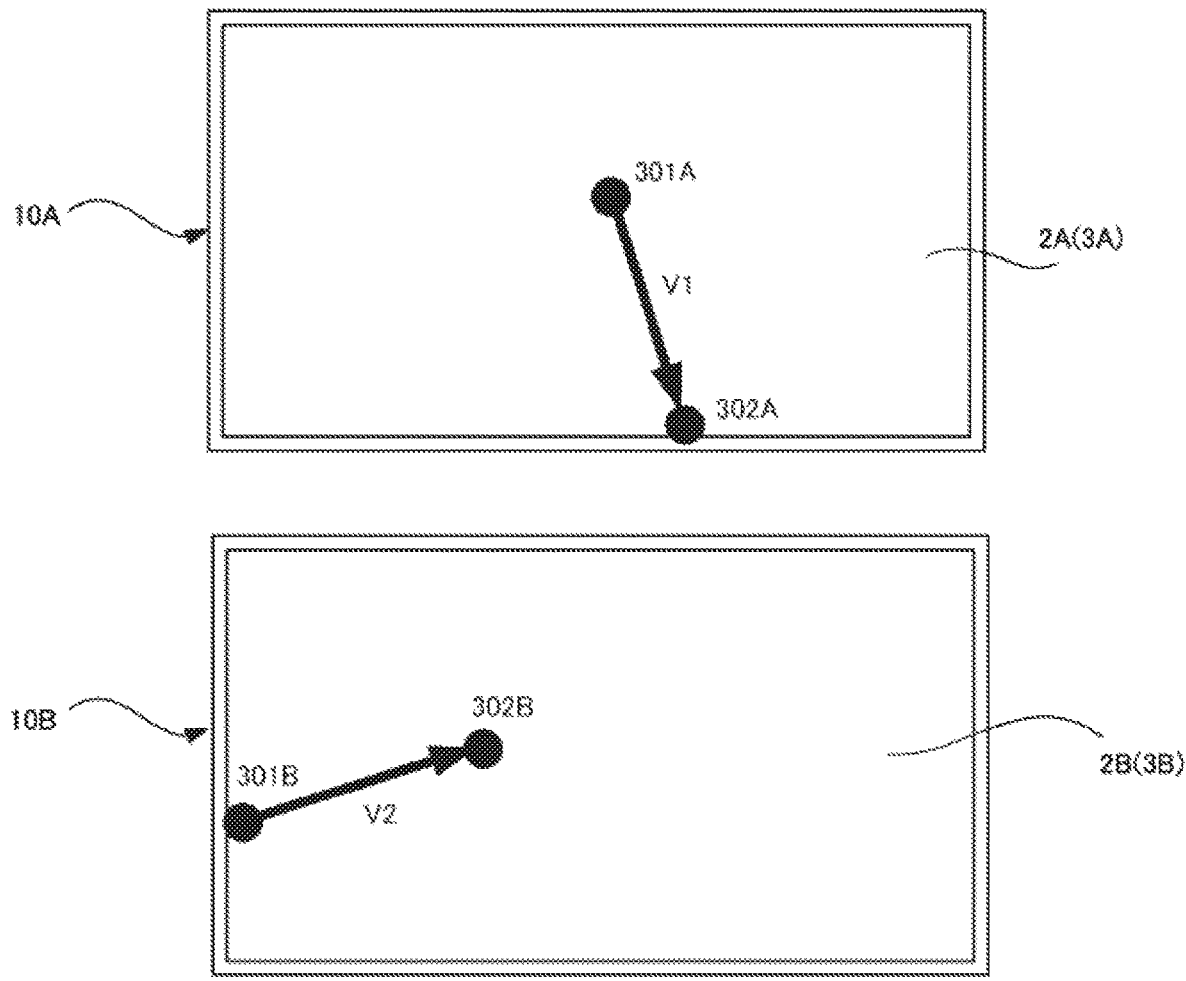
FIG. 6 is a plan view showing a process of setting the positional relationship with two game apparatuses.
Figure 7:
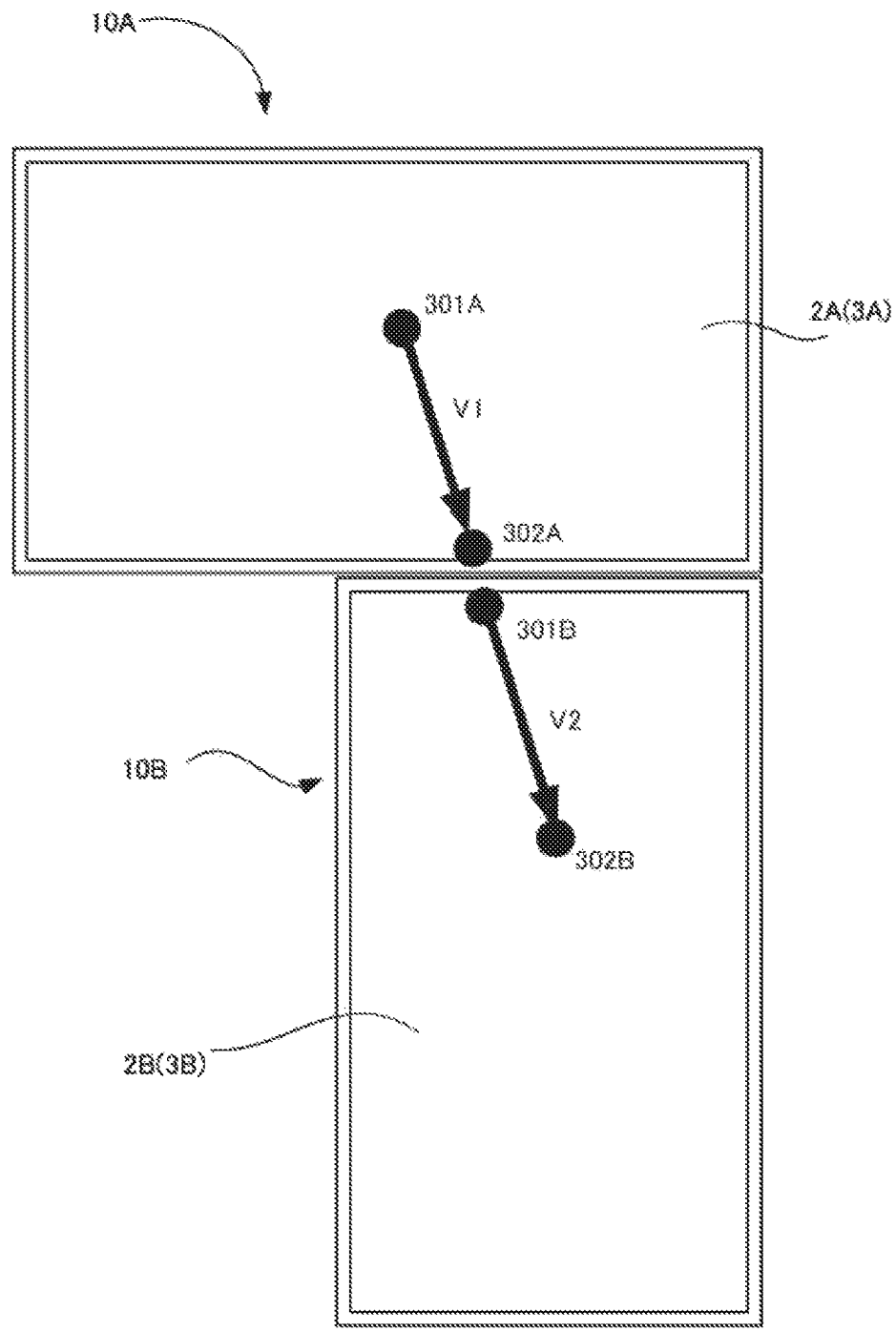
FIG. 7 is a plan view showing a process of setting the positional relationship with two game apparatuses.

Hereinafter, an example of setting the positional relationship will be described using two of the abovementioned game apparatus, with reference to FIGS. 4 to 7. FIG. 4 is a flowchart relating to processing for setting the positional relationship, and FIGS. 5 to 7 are diagrams illustrating setting of the positional relationship of two game apparatuses. Hereinafter, for convenience of description, the two game apparatuses will be referred to as a first game apparatus (first information processing apparatus) and a second game apparatus (second information processing apparatus). The LCD and the touch panel of the first game apparatus will be referred to respectively as a first LCD and a first touch panel, and the LCD and the touch panel of the second game apparatus will be referred to respectively as a second LCD and a second touch panel. Also, the configurations of the first and second game apparatuses are the same, and thus in the following description of the drawings, A will be given as the sign of the configuration relating to the first game apparatus and B will be given as the sign of the configuration relating to the second game apparatus. For example, the first touch panel is shown as 3A, and the second touch panel is shown as 3B.

When the first and second game apparatuses 10A and 10B are powered on, the CPUs 31A and 31B of the game apparatuses 10A and 10B execute a startup program stored in a boot ROM (illustration omitted), and the main memory and the like are thereby initialized. A game program stored in the external storage media 4A and 4B is then read to the main memories 32A and 32B via the external storage medium I/Fs, and execution of the game program is started by the CPUs 31A and 31B. Alternatively, a configuration may be adopted in which a game program downloaded to the internal memory media 34A and 34B for saving data, using wireless communication via the wireless communication modules 35A and 35B, is read to the main memories 32A and 32B and executed by the CPUs 31A and 31B.

The flowchart shown in FIG. 4 shows processing performed after the above processing is completed. The game apparatuses 10A and 10B may have a configuration in which the game program is executed immediately after the game apparatus is powered on, or may have a configuration in which an internally stored program that displays a predetermined menu screen is executed first after the game apparatus is powered on, and the game program is executed thereafter in response to the start of the game being instructed by a selection operation performed on the menu screen by the player, for example.

When the game program is executed, first, communication between the first game apparatus 10A and the second game apparatus 10B is started (step S101). When a connection (pairing) is established between both game apparatuses 10A and 10B, a state in which the game apparatuses can communicate with each other is then entered. Once pairing is established, respective identification numbers of the game apparatuses 10A and 10B are stored in the internal storage media 34A and 34B for data saving. Thus, even if both game apparatuses 10A and 10B are powered off, for example, a state in which communication is possible between both game apparatuses 10A and 10B will be entered by powering the game apparatuses on again.

This communication, as abovementioned, is performed by the wireless communication modules 35A and 35B provided in the game apparatuses 10A and 10B, and is for performing transmission and reception of data. That is, the respective touch processing on the touch panels 3A and 3B which will be described below and various types of data calculated based on each of the touch processing is mutually transmitted and received every time frame processing is performed. Accordingly, hereinafter, unless specifically stated otherwise, it is assumed that processing that is being performed in one of the game apparatuses is transmitted to the other game apparatus and data is mutually referred to.

Next, the player, as shown in FIG. 5, arranges both game apparatuses 10A and 10B in arbitrary positions, such that the first LCD 2A (and the first touch panel 3A) of the first game apparatus 10A and the second LCD 2B (and the second touch panel 3B) of the second game apparatus 10B are adjacent. Note that both game apparatuses 10A and 10B may be powered on after having been placed as shown in FIG. 5. In order to set the positional relationship of both game apparatuses 10A and 10B, the player then touches an arbitrary position on the touch panel of one of the game apparatuses with a finger, and slides the finger from that position to an arbitrary position on the touch panel of the other game apparatus. Here, as an example, the case where the player touches the first touch panel 3A of the first game apparatus 10A and slides the finger from that position to the second touch panel 3B of the second game apparatus 10B, as shown in FIG. 5, will be described.

Specifically, the player slides the finger from an arbitrary position on the first touch panel 3A to the periphery of the first touch panel 3A. Thereafter, the player slides the finger so as to pass over the gap between the first touch panel 3A and the second touch panel 3B, and after touching the periphery of the second touch panel 3B, slides the finger from that position to an arbitrary position of the second touch panel 3B. This slide input with a finger is performed continuously and roughly in a straight line. Hereinafter, the start point and the end point of the slide input on the first touch panel 3A (first slide input) will be referred to respectively as a first start point 301A (first position) and a first end point 302A, and the start point and the end point of the slide input on the second touch panel 3B (second slide input) will be referred to respectively as a second start point 301B and a second end point 302B (second position). Respective processing by the game apparatuses 10A and 10B when this slide input is performed will be described below in detail.

Before a slide input is performed, the game apparatuses 10A and 10B do not recognize their positional relationship. Thus, as shown in FIG. 6, the slide input is respectively detected in the game apparatuses 10A and 10B, without the positional relationship of both game apparatuses 10A and 10B being recognized. First, when the player touches the first start point 301A on the first touch panel 3A with a finger, the first touch panel 3A will detect this touch (step S102). The CPU 31A of the first game apparatus 10A thereby determines that a slide input will be performed from the first touch panel 3A of the first game apparatus 10A toward the second touch panel 3B of the second game apparatus 10B (step S103).

Next, when the player starts the slide input from the first start point 301A and the finger leaves the first touch panel 3A at the first end point 302A (YES at step S104), the slide input on the first touch panel 3A ends. In the process of this slide input, the coordinates touched on the first touch panel 3A are sequentially saved to the main memory 32A of the first game apparatus 10A (step S105). For example, while the touch is being detected (NO at step S104), coordinates can be saved every frame.

Then, when the player's finger touches the second start point 301B on the second touch panel 3B (YES at step S106), the time from when the finger leaves the first end point 302A until the second start point 301B is touched with the finger is calculated (step S107). This time will be referred to below as a non-touch time t1. When the player then starts the slide input again from the second start point 301B and the finger leaves the second touch panel 3B at the second end point 302B (YES at step S108), the slide input for setting the positional relationship ends. During the slide from the second start point 301B to the second end point 302B on this second touch panel 3B (NO at step S108), the coordinates touched on the second touch panel 3B are sequentially saved to the main memory 32B of the second game apparatus 10B (step S109).

After the slide input thus ends, the following computation is performed, in order to set the positional relationship of both game apparatuses 10A and 10B. That is, the CPU 31A of the first game apparatus 10A calculates a first vector V1 from the first start point 301A to the first end point 302A, based on the coordinates touched on the first touch panel 3A, as shown in FIG. 6. Similarly, the CPU 31B of the second game apparatus 10B calculates a second vector V2 from the second start point 301B to the second end point 302B. The positional relationship of the first and second touch panels 3A and 3B is then set from the abovementioned non-touch time t1, in addition to these first and second vectors V1 and V2 (step S110). That is, the positional relationship of the first and second touch panels 3A and 3B is set, as shown in FIG. 7, such that the first vector V1 and the second vector V2 are arranged side by side on a straight line, in the same time sequence as these vectors V1 and V2 were recorded. Note that the non-touch time t1 and the vectors V1 and V2 calculated after the slide input are mutually referred to by both game apparatuses 10A and 10B, and the positional relationship is calculated by at least one of the first game apparatus 10A and the second game apparatus 10B. This positional relationship is then mutually referred by the game apparatuses 10A and 10B.

Specifically, this positional relationship defines, for example, respective coordinates on the touch panels 3A and 3B (positions of pixels of the LCDs 2A and 2B) of both game apparatuses 10A and 10B placed in the positions shown in FIG. 5 in the global coordinate space in which the game space is defined. Because the positions of the pixels of both LCDs 2A and 2B are known, images that depend on the placement position of both game apparatuses can thereby be displayed on both LCDs 2A and 2B, and the game space can be displayed by the two LCDs 2A and 2B. At the time of playing a game, predetermined game processing for the game that will be played from now on is performed, based on this positional relationship, after the positional relationship is set, and the game space is displayed on the two LCDs 2A and 2B, based on this game processing (step S111).

The positions of the LCDs 2A and 2B in the global coordinate space can be set as follows, for example. That is, the angle formed by both touch panels 3A and 3B is calculated if the vectors V1 and V2 can be calculated, since the size and coordinates of the touch panels 3A and 3B and the LCDs 2A and 2B of the first and second game apparatuses 10A and 10B are known, and the distance between both touch panels 3A and 3B is calculated, since the distance between the first end point and the second start point can be calculated if the speed of the slide input and the non-touch time can be detected. The coordinates of the second touch panel 3B in the coordinate system of the first touch panel 3A can thereby be calculated. The coordinates of the second touch panel 3B can also be represented with global coordinates, if the position and angle (posture) of the first touch panel 3A in the global coordinate space have been set in advance. Also, the coordinates of the touch panels 3A and 3B roughly coincide with the respective positions (coordinates) of pixels of the LCDs 2A and 2B, thus enabling the coordinates of both LCDs 2A and 2B to be represented with global coordinates. As a result, an image that depends on the placement position of both game apparatuses 10A and 10B can be displayed on both LCDs 2A and 2B.

Note that the number of samplings for calculating a vector in the touch panels 3A and 3B can be determined in advance. For example, the number of frames (time period) in which a touch is detected on the first touch panel 3A is calculated, and the number of frames in which a touch is detected on the second touch panel 3B is further calculated. In the case where neither satisfies a predetermined number of frames such as 15 frames, for example, the vectors are not calculated, and thus setting of the positional relationship is not performed. In this case, display prompting the player to redo the slide input can be performed on at least one of the first and second LCDs 2A and 2B.

Incidentally, in the case where the number of frames (time period) from the first end point 302A to the second start point 301B is greater than or equal to a predetermined number of frames, such as 80 frames, for example, it is determined that the slide input spanning from the first touch panel 3A to the second touch panel 3B is not continuous, and setting of the positional relationship is not performed. Display prompting the player to redo the slide input can also be performed on at least one of the first and the second LCDs 2A and 2B in this case.

Figure 8:
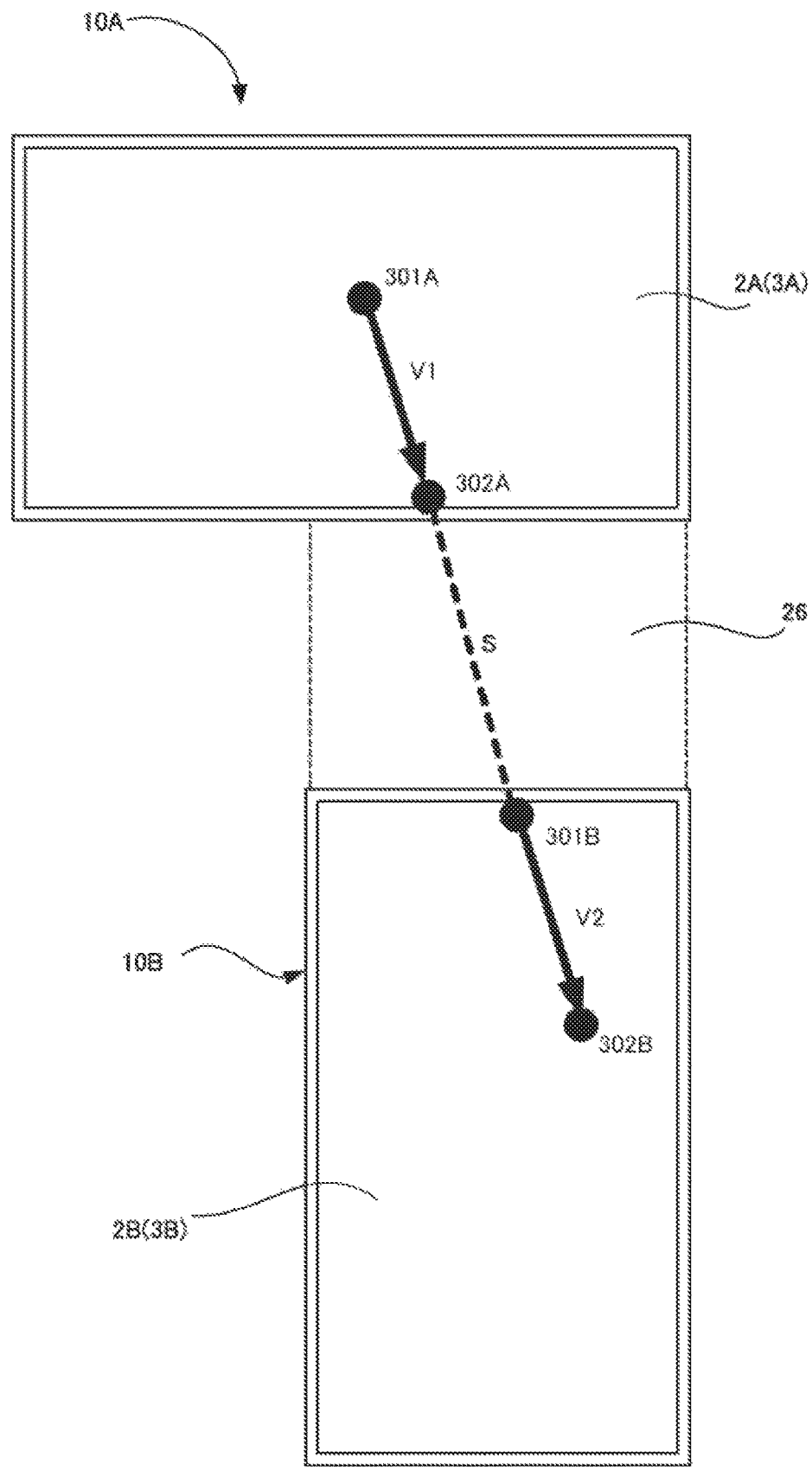
FIG. 8 is a plan view showing setting of the positional relationship in the case where a space is formed between two game apparatuses.

Also, a virtual space 26 can be set between both touch panels 3A and 3B, according to the length of the non-touch time t1. For example, as shown in FIG. 8, a distance S between the first end point 302A and the second start point 301B is calculated from the non-touch time t1 and the speed of the slide input in which the first vector V1 or the second vector V2 is generated, and a virtual space 26 that depends on this distance S is set between both touch panels 3A and 3B. That is, the positional relationship of the first and second touch panels 3A and 3B is set such that the vector V1 and the vector V2 are arranged side by side on the same straight line at the distance S between them.

The speed of the slide input that is used here is not particularly limited, and any of the speeds of the slide input from the first start point 301A to the second end point 302B may be used. For example, the average speed of the slide input on the first touch panel 3A may be used, or the average speed of the slide input on the second touch panel 3B may be used. Alternatively, the average speed of the entire slide input spanning from the first touch panel 3A to the second touch panel 3B can also be used. Additionally, the speed of a portion of each slide input or the average speed thereof can also be used.

A virtual space 26 such as the above can be set as appropriate according to the type of game. This point will be discussed later. Also, if the non-touch time t1 is less than or equal to a predetermined time, setting of the positional relationship can be performed assuming that both touch panels 3A and 3B are in contact, without setting the virtual space 26.

The above description gave an example of setting the positional relationship in the case where the touch panels 3A and 3B of both game apparatuses 10A and 10B are arranged in the same two-dimensional plane, but processing is performed as follows, in the case where at least one of the game apparatuses 10A and 10B is arranged to incline three-dimensionally and both game apparatuses 10A and 10B intersect three-dimensionally. That is, in the case where the first game apparatus 10A is placed to incline with respect to the second game apparatus 10B, the inclinations (postures) of the casings 1A and 1B of the game apparatuses 10A and 10B calculated by the CPUs 31A and 31B of the game apparatuses 10A and 10B are calculated from the angular velocities about the XYZ axes detected by the inertial sensors 36A and 36B. Accordingly, the positional relationship of both game apparatuses 10A and 10B is set in consideration of this inclination. Specifically, the coordinates of the LCDs 2A and 2B can be represented with three-dimensional global coordinates.

Also, the calculated posture can affect the image that is displayed on the LCDs 2A and 2B. For example, an inclined surface can be set within the game space or the speed and course of an object that moves through the game space can be determined, according to the state of intersection of the two game apparatus 10A and 10B (specifically, state of intersection of display surfaces of both LCDs 2A and 2B). Specific examples will be given in the description of a second exemplary game which will be discussed later.

2-2-2. Examples of Games

Next, examples of games after setting of the positional relationship has been performed as abovementioned will be described. The following examples of games are, however, a portion thereof, and the above setting of the positional relationship can be applied to a variety of games.

First Exemplary Game

A first exemplary game will be described with reference to FIGS. 9 and 10. The first game is a hockey game, as shown in FIG. 10. This game involves using band-like bars 72A and 72B to hit a ball 71 that moves through the game space back to each other. In this example, the first game apparatus 10A is arranged above in FIG. 9, and the second game apparatus 10B is arranged below. Here, in FIG. 9, the upper long sides of the touch panels 3A and 3B and the LCDs 2A and 2B will be referred to as first long sides 21A and 21B, and the lower long sides will be referred to as second long sides 22A and 22B, and the left short sides in FIG. 9 will be referred to as first short sides 23A and 23B, and the right short sides will be referred to as second short sides 24A and 24B.

Figure 9:
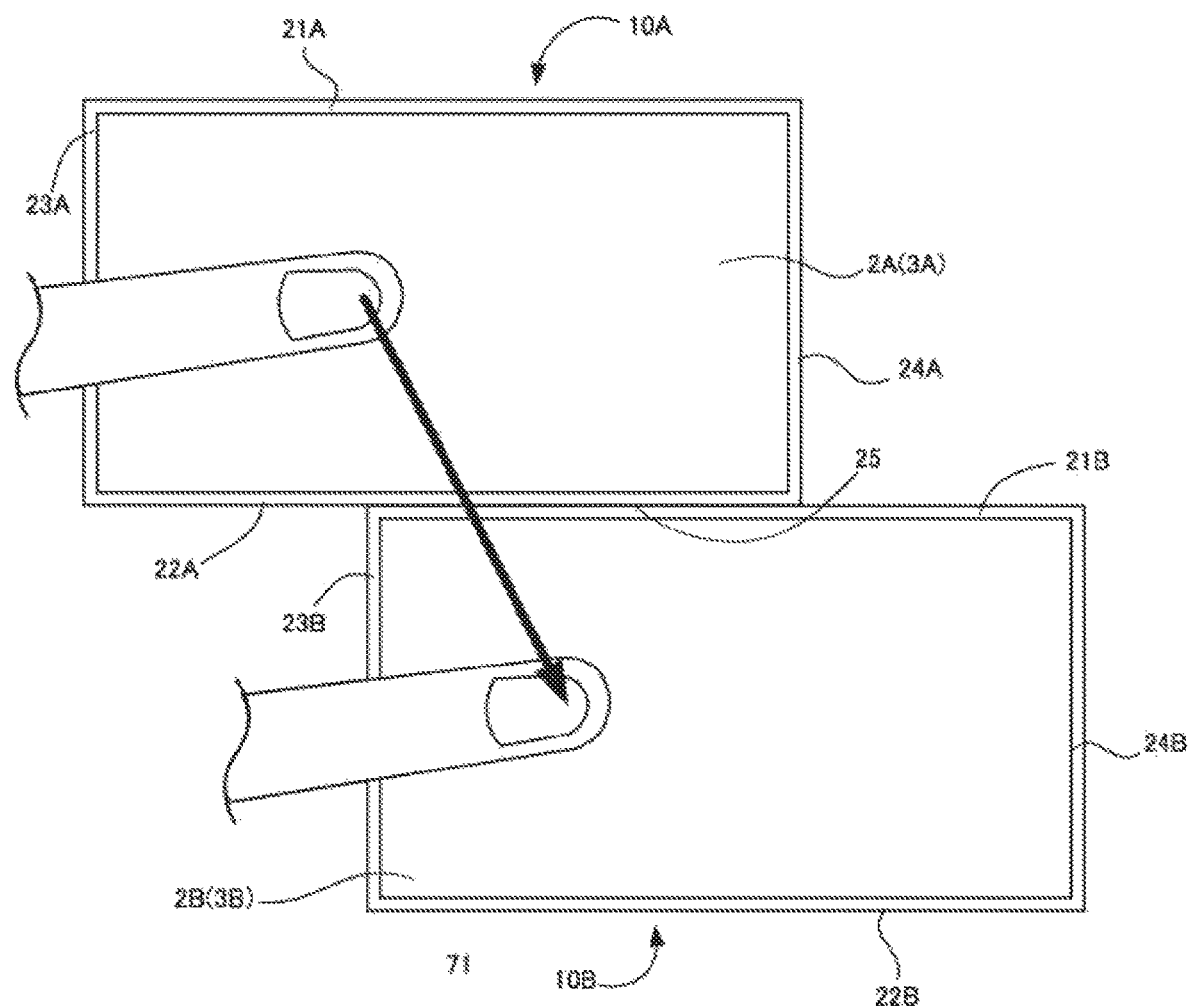
FIG. 9 is a plan view showing setting of the positional relationship in a first exemplary game.
Figure 10:
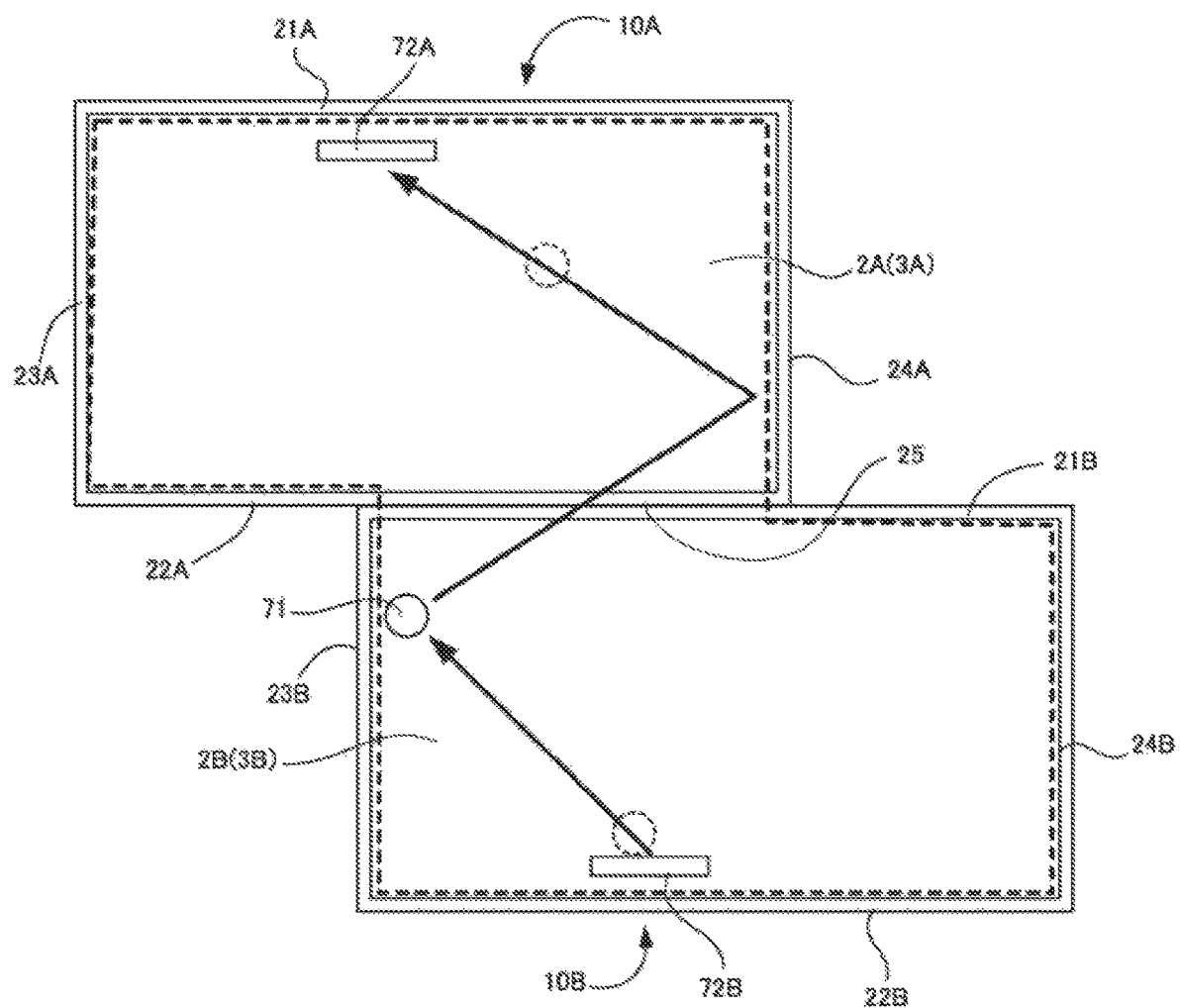
FIG. 10 is a plan view showing the first exemplary game.

In the example of FIG. 9, the long sides 22A and 21B of the two LCDs 2A and 2B contact each other in parallel, although both long sides 22A and 21B contact each other so as to be shifted in the long-side direction rather than being perfectly aligned. When the player slides a finger from the first touch panel 3A toward the second touch panel 3B, as abovementioned, with both game apparatuses 10A and 10B placed in such a state, the positional relationship of both LCDs 2A and 2B is set. Game processing for starting the hockey game is then performed, based on this positional relationship, and the display range of the game space is set on both LCDs 2A and 2B, such that two rectangular shapes are arranged out of alignment, as shown in FIG. 10, based on this game processing. In the case of a three-dimensional game space, the display range is set by setting variables such as the position, orientation and angle of view of a virtual camera. Also, a contact portion 25 where the second long side 22A of the first LCD 2A and the first long side 21B of the second LCD 2B are in contact is set such that the spaces of the two-dimensional planes that are formed by both LCDs 2A and 2B are in communication. The range over which the ball 71 can move within the game space will be a space enclosed by the periphery of both LCDs 2A and 2B excluding the contact portion, and the periphery of both LCDs 2A and 2B will serve as a wall off which the ball 71 rebounds.

After setting of the positional relationship, the first bar 72A that the player of the first game apparatus 10A operates and the second bar that the player of the second game apparatus operates are arranged in this game space, as shown in FIG. 10. The first bar 72A is displayed on the first LCD 2A, and can be moved along the first long side 21A by the player of the first game apparatus 10A. The method of moving the first bar 72A is not particularly limited, and the player is, for example, able to touch the first bar 72A and slide it along the first long side 21A.

On the other hand, the second bar 72B is also displayed on the second LCD 2B. This second bar 72B is arranged so as to be along the second long side 22B, and the player of the second game apparatus 10B is able to move this second bar 72B, similarly to the first game apparatus 10A.

The ball 71 is then displayed in the game space when the game is started, and this ball moves. The ball 71 moves back and forth between the first LCD 2A and the second LCD 2B, while rebounding off the wall of the periphery of the game space. At this time, the players hit the ball 71 back with the bars 72A and 72B while moving the bars 72A and 72B, and move the ball 71 toward the LCD 2A or 2B side of the other player. When one of the player is not able to hit the ball 71 back with the bar 72A or 72B and the ball 71 hits the long side 21A or 22B, the player on that long side loses, and one game ends.

Figure 11:
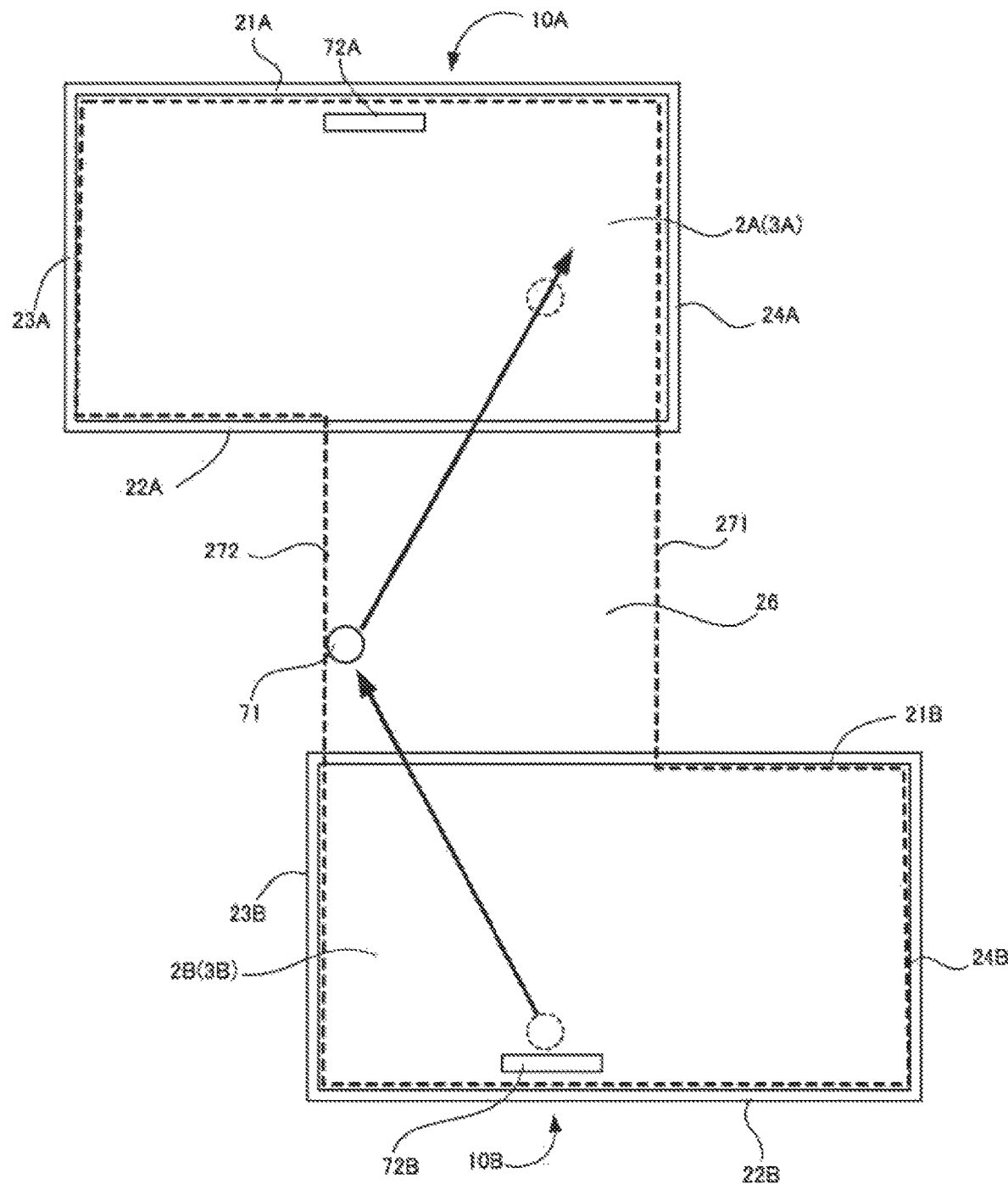
FIG. 11 is a plan view showing the first exemplary game.

Note that in the case where it is detected, at the time of setting of the positional relationship, that both touch panels 3A and 3B are separated, the virtual space 26 is formed between both touch panels 3A and 3B. For example, a rectangular virtual space 26 can be set between the display ranges of both touch panels 3A and 3B, as shown in FIG. 11. This virtual space 26 can be variously set, and, for example, a first perpendicular line 271 extending from a right end part of the second long side 22A of the first LCD 2A to the first long side 21B of the second LCD 2B is set, as shown in FIG. 11. Similarly, a second perpendicular line 272 extending from a left end part of the first long side 21B of the second LCD 2B to the second long side 22A of the first LCD 2A is set. A space enclosed by the second long side 22A of the first LCD 2A, the first long side 21B of the second LCD 2B and the two perpendicular lines 271 and 272 is then set as the virtual space 26, and a range obtained by adding this virtual space to the space that is defined by both LCDs 2A and 2B is set as the range over which the ball 71 can move. The two perpendicular lines 271 and 272 that constitute the periphery of the virtual space 26 also thereby serve as walls off which the ball 71 rebounds.

In the case where the ball 71 moves from the second LCD 2B to the first LCD 2A, as shown in FIG. 11, for example, the ball 71 passing through the virtual space 26 is not displayed, but display of the ball 71 is set such the ball 71 passes through the first long side 21B of the second LCD 2B, and then after a predetermined time (time that taken the movement speed of the ball 71 into consideration) has elapsed, the ball 71 appears from the second long side 22A of the first LCD 2A. That is, display is performed such that the ball 71 appears to pass through the virtual space 26 between both LCDs 2A and 2B. At this time, the position at which the ball 71 appears on the second long side 22A of the first LCD 2A is set, with consideration also given to factors such as the movement speed of the ball 71, the length of the virtual space 26, the angle of incidence angle of the ball 71 on the virtual space 26, and the position of the walls 271 and 272 of the periphery.

The method of setting such a virtual space 26 is not particularly limited, and as long as the distance between both touch panels 3A and 3B is set based on the abovementioned non-touch time t1 and speed of the slide input, the shape of the virtual space 26, such as the distance between the perpendicular lines 271 and 272, for example, can be set as appropriate according to the type of game.

Second Exemplary Game

Figure 12:
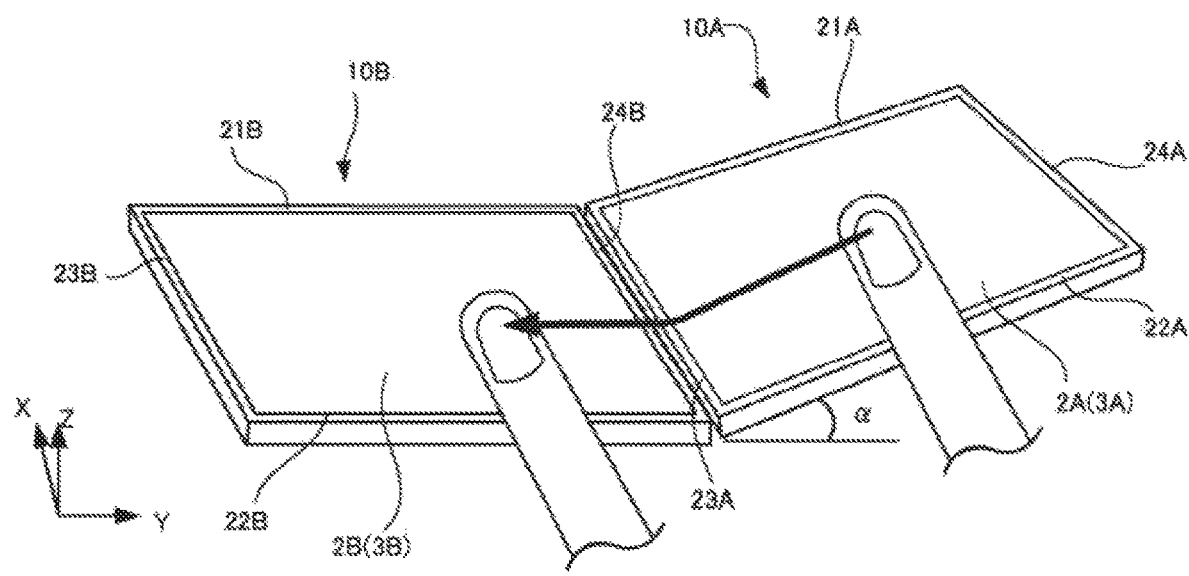
FIG. 12 is a perspective diagram showing setting of the positional relationship in a second exemplary game.
Figure 13:
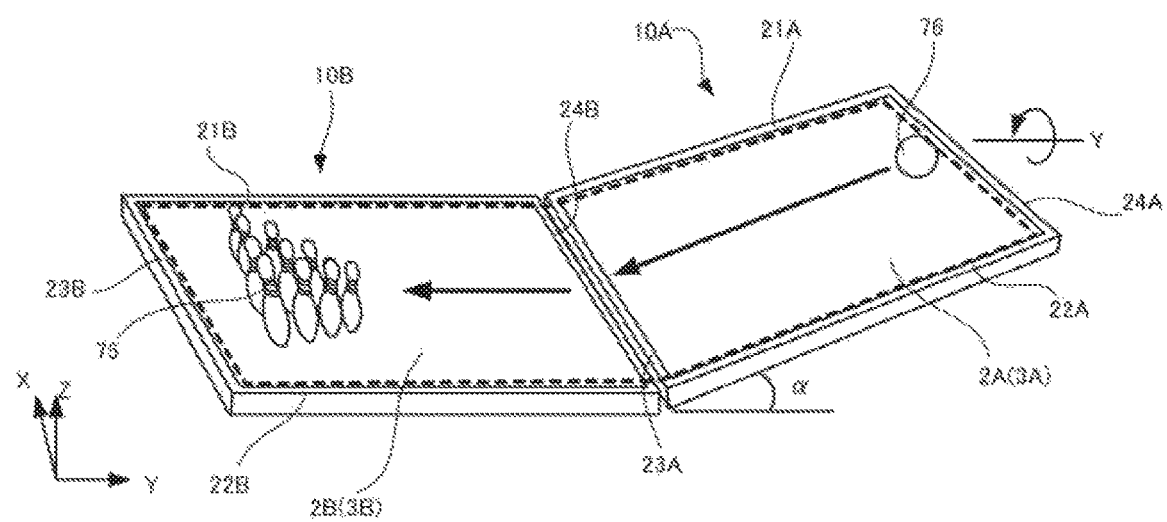
FIG. 13 is a perspective diagram showing the second exemplary game.

A second exemplary game will be described with reference to FIGS. 12 and 13. As shown in FIG. 13, the second exemplary game is a bowling game. This game involves knocking down bowling pins 75 displayed in the game space with a ball 76. In the example of FIG. 12, the first game apparatus 10A is arranged on the right side and the second game apparatus 10B is arranged on the left side. In FIG. 12, the long sides on the upper side of the touch panels 3A and 3B and the LCDs 2A and 2B are referred to as first long sides 21A and 21B, and the long sides on the lower side are referred to as second long sides 22A and 22B, and the short sides on the left side of FIG. 12 are referred to as first short sides 23A and 23B, and the short sides on the right side are be referred to as second short sides 24A and 24B.

In the example of FIG. 12, the short sides 23A and 24B of the two LCDs 2A and 2B contact each other in parallel. That is, both LCDs 2A and 2B are coupled so as to be horizontally long. The second game apparatus 10B is, however, arranged in a horizontal plane, and the first game apparatus 10A is placed so as to incline with respect to the second game apparatus 10B. At this time, both game apparatuses 10A and 10B calculate the postures (inclinations) of the casings 1A and 1B, according to output values from the inertial sensors 36, and calculate the angle of intersection of both casings 1A and 1B, based on these postures. In this example, the first game apparatus 10A intersects the second game apparatus 10B which is in a horizontal plane at an angle α about the X-axis. That is, the display surfaces of both LCDs 2A and 2B are in a state of intersecting at the angle α. The game is then set, as will be discussed later, based on this state of intersection.

When the player slides a finger from the first touch panel 3A toward the second touch panel 3B, as shown in FIG. 12, in such a placement state of both game apparatuses 10A and 10B, the positional relationship of both LCDs 2A and 2B is set. Game processing for starting the bowling game is performed, based on this positional relationship, and a game space in which two rectangular shapes are arranged side by side in the lengthwise direction is set, as shown in FIG. 13, based on this game processing. To give a more detailed description, the contact portion where the first short side 23A of the first LCD 2A and the second short side 24B of the second LCD 2B are in contact is set such that the spaces formed by both LCDs 2A and 2B are in communication. The range over which the ball 76 can move within the game space (region enclosed with the broken line) will be the space enclosed by the periphery of both LCDs 2A and 2B excluding the contact portion.

This game is a bowling game that involves rolling the ball 76 arranged on the second short side 24A of the first LCD 2A toward the pins 75 arranged on the first short side 23B of the second LCD 2B and knocking the pins 75 down, as shown in FIG. 13. Thus, the long sides 21 and 22 of both LCDs 2A and 2B represent the gutters, and the score will be 0 when the ball 76 contacts these portions.

Also, since the casing 1A of the first game apparatus 10A inclines with respect to the casing 1B of the second game apparatus 10B, as shown in FIG. 13, settings are configured such that the first LCD 2A is an inclined surface that inclines with respect to the second LCD 2B, based on this angle α. The ball 76 that moves within the first LCD 2A is thereby set as the ball 76 that rolls down the inclined surface, and the movement speed of the ball 76 can, for example, be set so as to become faster as the ball moves from the second short side 24A of the first LCD 2A toward the first short side 23A. On the other hand, since the second game apparatus 10B is arranged in a horizontal plane, the movement speed of the ball 76 can, for example, be set so as to gradually decrease in the second LCD 2B.

The game is played as follows. When the display range is set based on the positional relationship, as abovementioned, the ball 76 and the pins 75 are displayed in the game space, as shown in FIG. 13. The player then, for example, flicks the ball 76 displayed on the first LCD 2A toward the second LCD 2B with a finger and the ball 76 rolls. The movement speed and the movement direction of the ball 76 are determined by factors such as the slide speed and direction of the finger at this time, and the ball 76 moves based on the determined movement speed and direction. When the ball 76 moves from within the first LCD 2A to the second LCD 2B and hits the pins 75, the pins 75 fall over, based on predetermined rules. For example, the pins 75 that fall over are calculated, according to the pin 75 that the ball 76 initially hits, and the position, angle and speed at which that pin 75 is hit, and animation of the pins 75 falling over, for example, is displayed on the second LCD 2B, based this calculation. One game thus ends.

Note that, in the example of FIG. 13, a state in which the first short side 23A of the first LCD 2A and the second short side 24B of the second LCD 2B are placed so as contact fully is shown, but the first game apparatus 10A can also be arranged so as to be rotated about the Y-axis, for example, from this state. In such a placement state, an inclined surface that also inclines in the short-side direction is set, and the speed and direction of the rolling ball 76 are determined based on this state.

Third Exemplary Game

Figure 14:
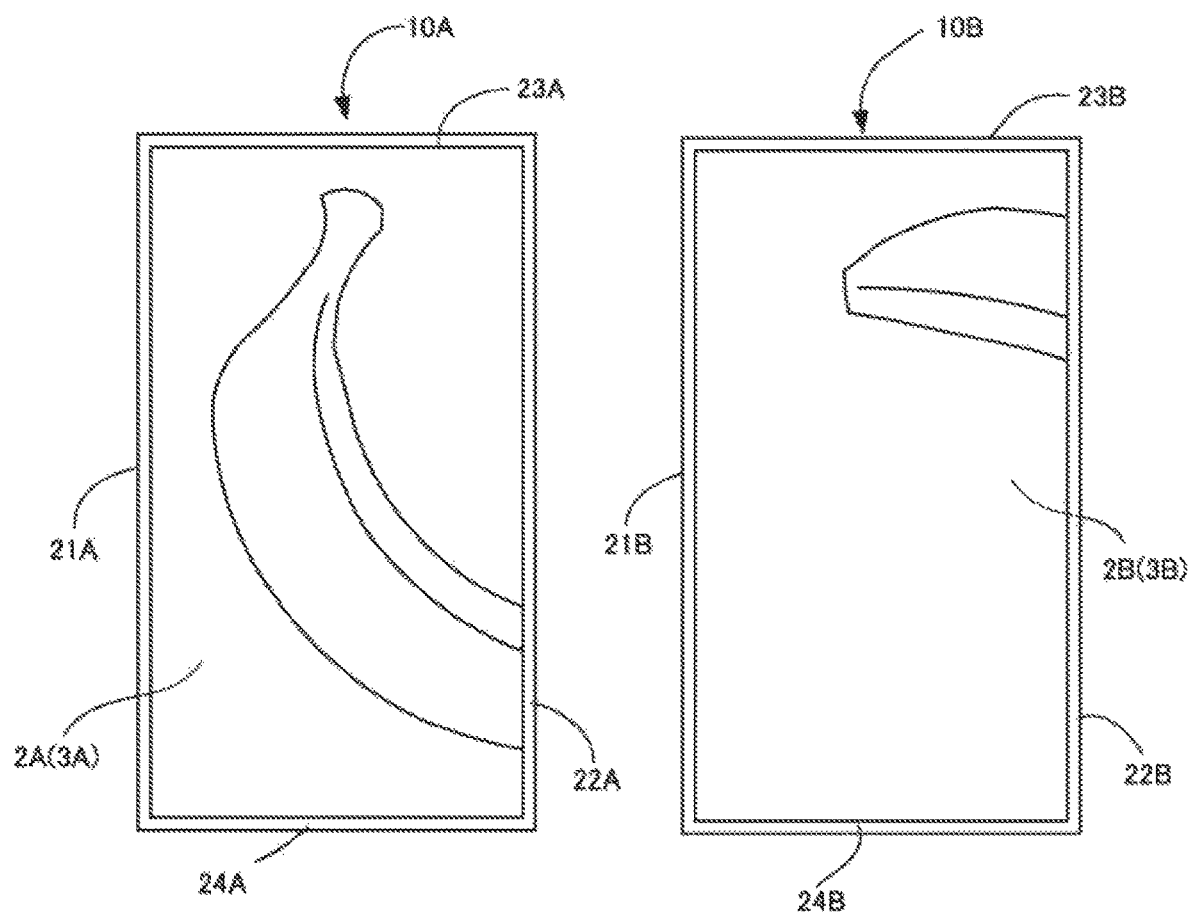
FIG. 14 is a plan view showing a third exemplary game.

A third exemplary game will be described with reference to FIG. 14. As shown in FIG. 14, the third exemplary game is a puzzle game that involves piecing together a picture that has been divided up. That is, in this game, pieces of a divided picture are displayed on the LCDs 2A and 2B of the game apparatuses 10A and 10B, and the divided picture is united in the correct position by joining these LCDs 2A and 2B together.

In this game, an image of a banana is divided in two as an example, and the divided images are respectively displayed on the LCDs 2A and 2B of the game apparatuses 10A and 10B, as shown in FIG. 14. The puzzle is solved if the divided images can be united in the correct position to display the banana, by joining the LCDs 2A and 2B together. As a prerequisite to this, a positional relationship of both touch panels 3A and 3B that enables the divided images to be united in the correct position to display the banana is set in advance in the game program. That is, positions of the LCDs 2A and 2B in the global coordinate space or in a local coordinate space relating to the first game apparatus 10A or the second game apparatus 10B, that enable the banana to be correctly united, are determined in advance.

Figure 15:
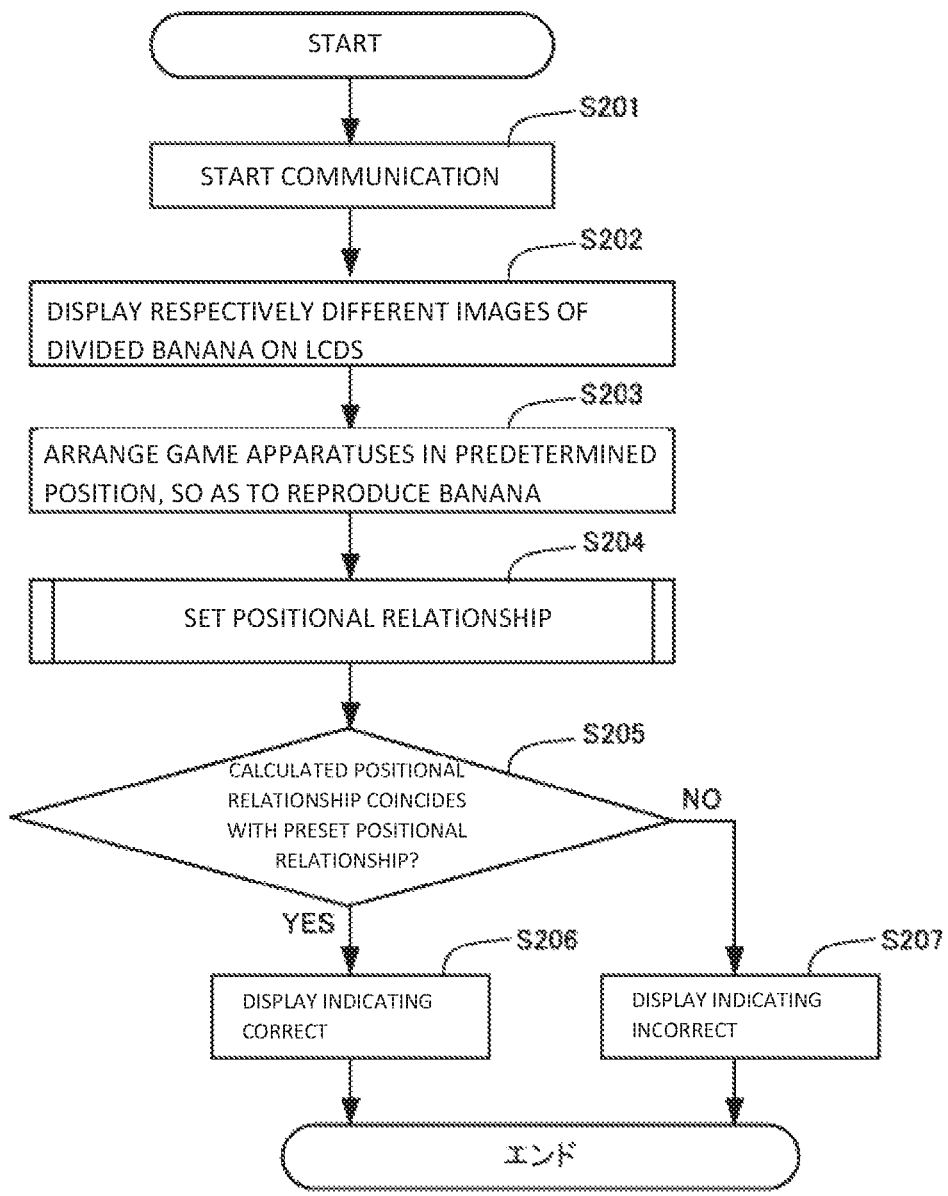
FIG. 15 is a flowchart showing processing in the third exemplary game.
Figure 16:
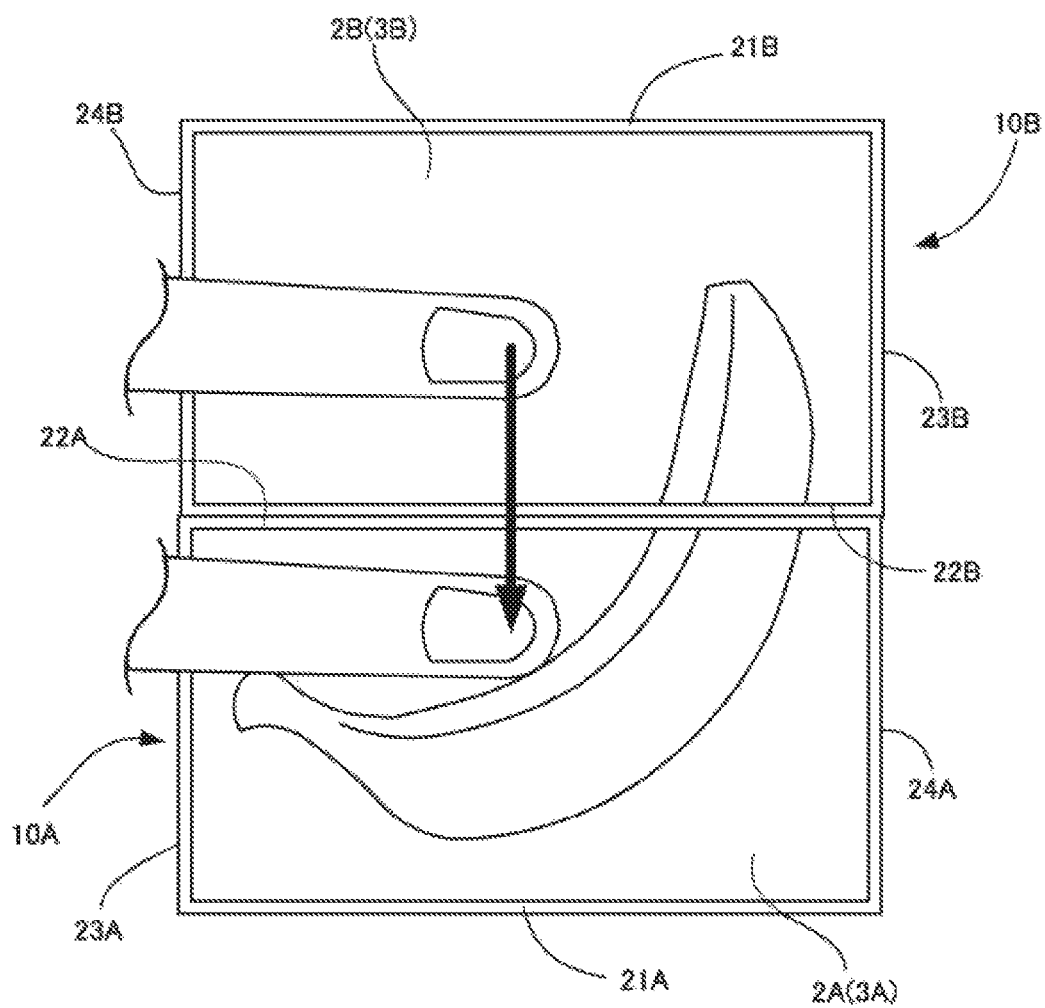
FIG. 16 is a plan view showing setting of the positional relationship in the third exemplary game.
Figure 17:
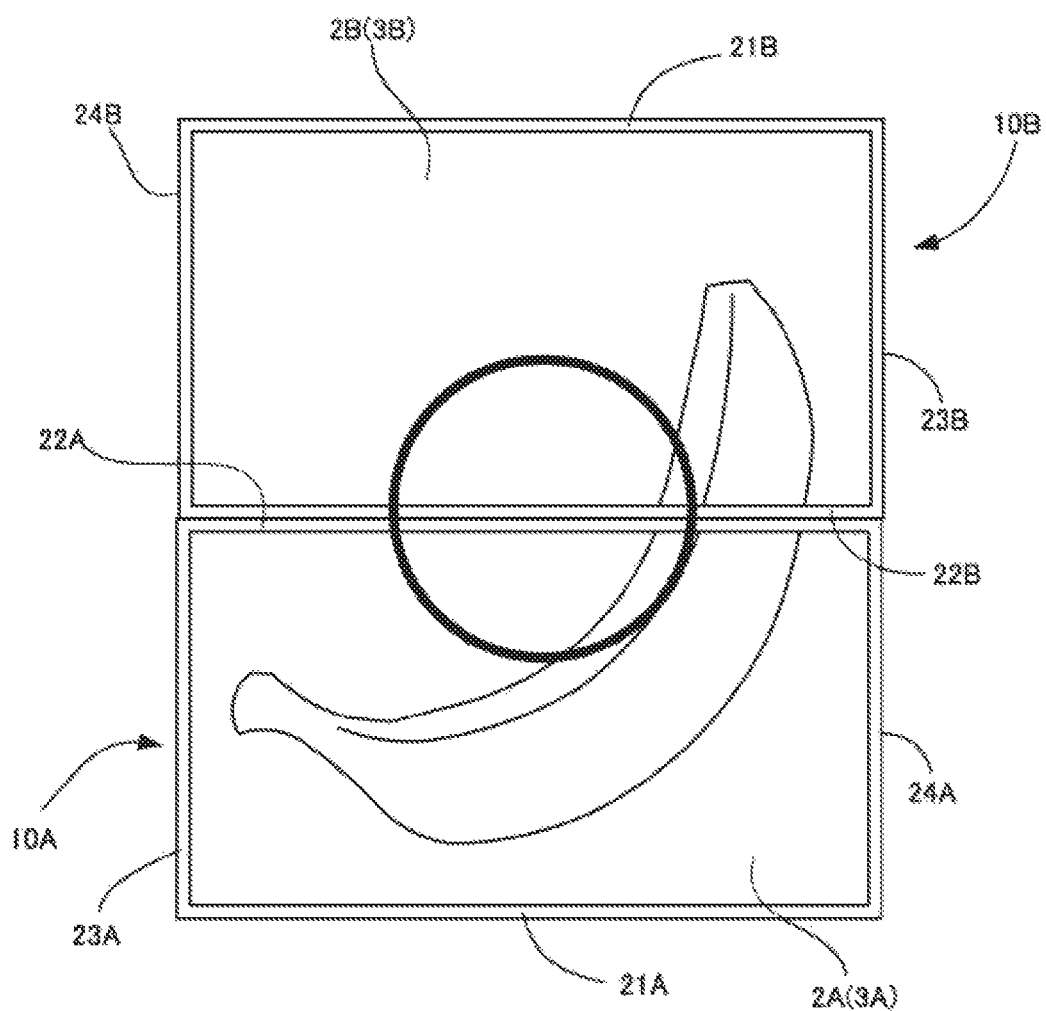
FIG. 17 is a plan view showing the third exemplary game.
Figure 18:
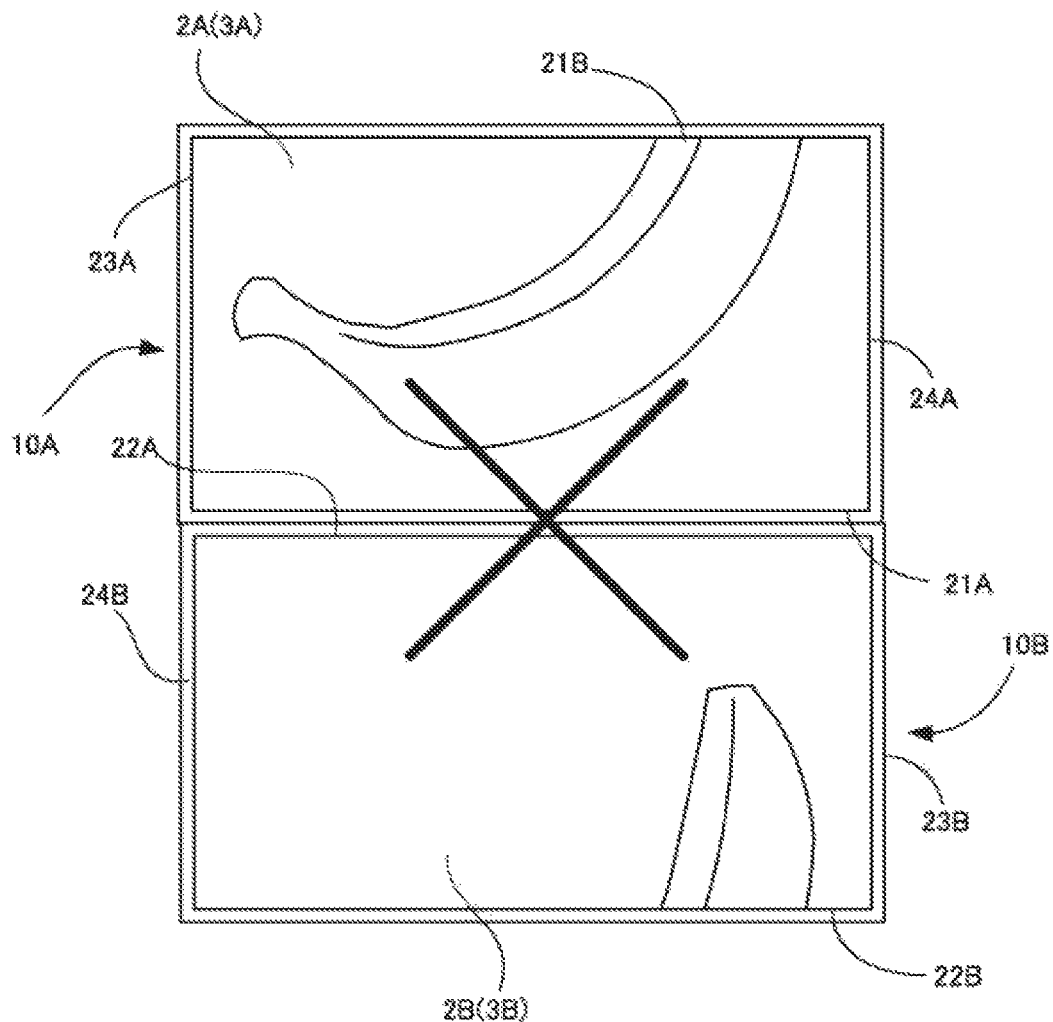
FIG. 18 is a plan view showing the third exemplary game.

Accordingly, with this game, unlike the above first and second games, setting of the positional relationship by sliding a finger is performed last. Processing of this game will be described below, with reference to FIGS. 15 to 18. FIG. 15 is a flowchart showing this game processing, and FIGS. 16 to 18 are diagrams showing the positions of the game apparatuses and the like.

First, when the game apparatuses are powered on and the game program is executed, communication is started between the first game apparatus 10A and the second game apparatus 10B (step S201). Then, as shown in FIG. 14, images of a banana divided in two are respectively displayed on the LCDs 2A and 2B of the game apparatuses 10A and 10B (step S202). Next, the player moves the casings 1A and 1B of both game apparatuses 10A and 10B, such that the images displayed on both LCDs 2A and 2B are united in the correct position and the banana is reproduced (step S203).

When both casings 1A and 1B are placed in positions that the player considers to be the correct positions, the player then slides a finger from the first touch panel 3A toward the second touch panel 3B in this placement state. The positional relationship of both touch panels 3A and 3B is thereby set (step S204), and when this positional relationship coincides with the positional relationship set in advance (YES at step S205), an "O" image indicating that the puzzle has been solved is displayed so as to straddle both LCDs 2A and 2B, as shown in FIG. 17 (step S206). On the other hand, when this positional relationship does not coincide with the positional relationship set in advance, (NO at step S205), an "x" image indicating that the puzzle has not been solved is displayed so as to straddle both LCDs 2A and 2B, as shown in FIG. 18 (step S207). Note that setting the positional relationship in step S204 involves performing the same processing as steps S102 to S110 of the flowchart in FIG. 4. Also, the image of a banana is one example, and a variety of images can be used.

3. Features

According to the present embodiment, as abovementioned, display can be performed with a high degree of freedom using the LCD 2A of the first game apparatus 10A and the LCD 2B of the second game apparatus 10B. That is, these LCDs 2A and 2B are not fixed in position, and the two LCDs 2A and 2B can be arranged in arbitrary positions by moving the game apparatuses 10A and 10B. In order to set the positional relationship of such LCDs 2A and 2B, in the present embodiment, a slide input from the first start point 301A on the first touch panel 3A toward the second end point 302B on the second touch panel 3B is performed. As a result of this slide input, a first vector V1 corresponding to the slide input on the first touch panel 3A and a second vector V2 corresponding to the slide input on the second touch panel 3B can be calculated, thus enabling the positional relationship of the two LCDs 2A and 2B to be set, based on these vectors. Accordingly, predetermined game processing can be performed, from the set positional relationship, irrespective of the positions in which the two LCDs 2A and 2B are placed, enabling display that is based on this game processing to be performed on the two LCDs 2A and 2B. Therefore, as shown with the abovementioned exemplary games, display with a high degree of freedom can be performed using the two LCDs 2A and 2B.

Note that, in the above embodiment, both casings 1A and 1B of the game apparatuses 10A and 10B are arranged in parallel, such that some of the sides of the casings 1A and 1B come in contact, but even in the case of other positional relationships, such as both casings 1A and 1B coming in contact at different angles (e.g., FIG. 21 which will be discussed later) or being separated, the game space can be displayed on the game apparatuses 10A and 10B, after setting the positional relationship as described above. Also, although a slide input from the first touch panel 3A to the second touch panel 3B was described as an example, the direction of the slide input is not particularly limited, and may be a slide input from the second touch panel 3B to the first touch panel 3A.

4. Variations

Although an embodiment of the present invention has been described above, the present invention is not limited to the above embodiment, and various modifications can be made insofar as they do not depart from the spirit of the invention. For example, the following modifications can be made. Also, the following modifications can be combined as appropriate.

4-1

In the above embodiment, settings are configured to start communication between the first game apparatus 10A and the second game apparatus 10B and automatically perform pairing when the game apparatuses are powered on, but this pairing can also be performed manually utilizing the abovementioned slide input. The operation for pairing will be described below in detail.

Figure 19:
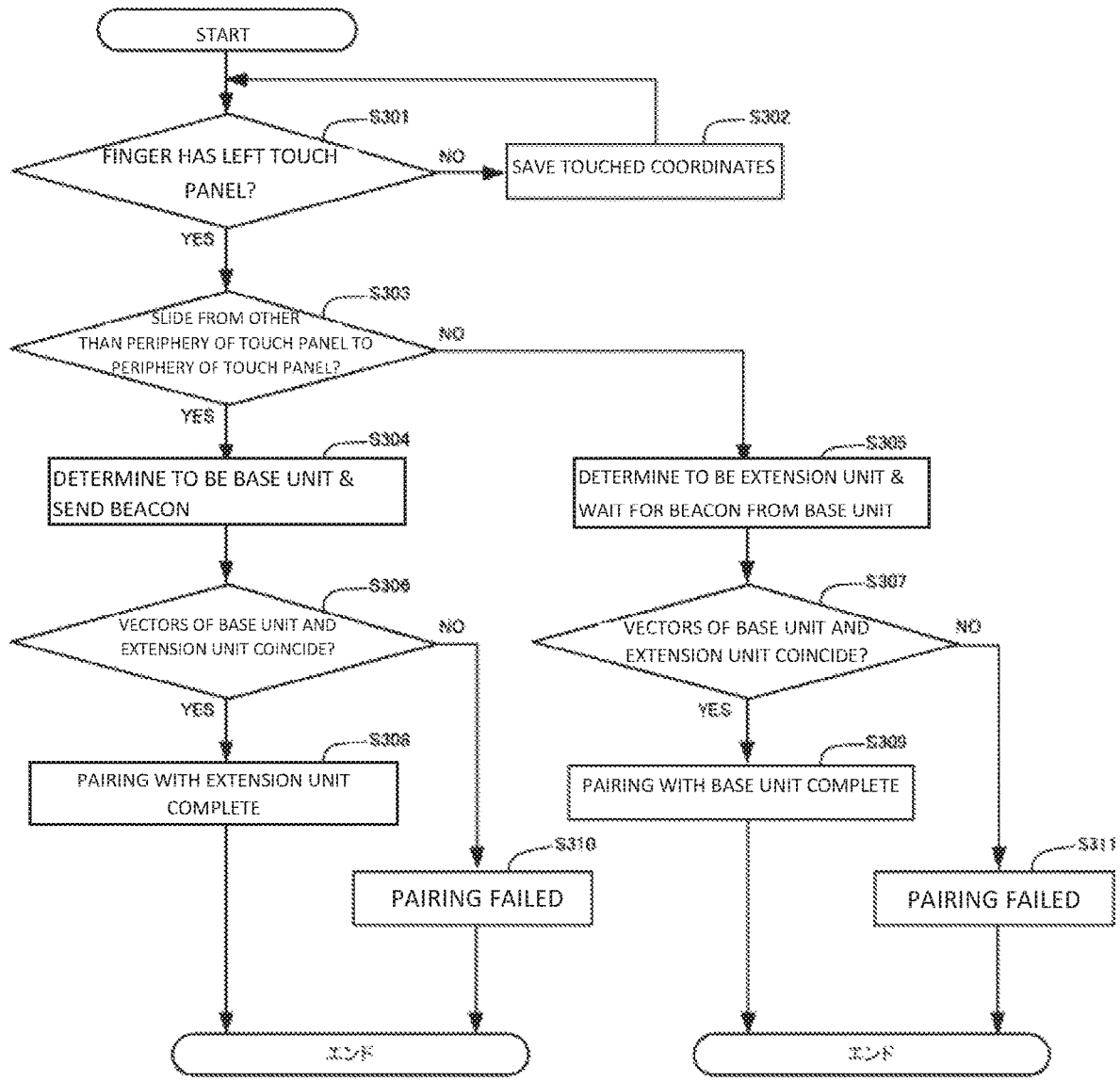
FIG. 19 is a flowchart showing processing relating to pairing of two game apparatuses.

FIG. 19 is a flowchart of processing by the first game apparatus or the second game apparatus for pairing. In this pairing, game apparatuses having the abovementioned configuration can be used. The game program is, however, created such that the processing for pairing shown below is executed.

First, when the first and second game apparatuses 10A and 10B are powered on, the CPUs 31A and 31B of the game apparatuses 10A and 10B execute the startup program that is stored in the boot ROM which is not illustrated, and the main memory and the like are thereby initialized. The game program is then read to the main memories 32A and 32B, and executed by the CPUs 31A and 31B.

The flowchart shown in FIG. 19 is a flowchart showing processing that is performed after the above processing is completed. When the game program is executed, first, the player touches an arbitrary position on the touch panel of one of the game apparatuses with a finger in order to perform pairing, and slides the finger from that position to an arbitrary position on the touch panel of the other game apparatus. Here, as an example, a slide input is performed from the first touch panel 3A of the first game apparatus 10A toward the second touch panel 3B of the second game apparatus 10B, similarly to the above embodiment. Description will now be given using the first start point 301A, the first end point 302A, the second start point 301B and the second end point 302B defined in that process.

First, the player starts the slide input from the first start point 301A, and when the finger leaves the first touch panel 3A at the first end point 302A (YES at step S301), the slide input on the first touch panel 3A ends. In the process of this slide input (NO at step S301), the coordinates touched on the first touch panel 3A are sequentially saved to the main memory 32A of the first game apparatus 10A (step S302). The first vector V1 from the first start point 301A to the first end point 302A is then calculated, based on the coordinates touched on the first touch panel 3A.

The player then starts a slide input from the second start point 301B on the second touch panel 3B, and when the finger leaves the second touch panel 3B at the second end point 302B (YES at step S301), the slide input for pairing ends. During the slide input from the second start point 301B to the second end point 302B on this second touch panel 3B (NO at step S301), the coordinates touched on the second touch panel 3B are also sequentially saved to the main memory 32B of the second game apparatus 10B (step S302). The second vector V2 from the second start point 301B to the second end point 302B is then calculated, based on the coordinates touched on the second touch panel 3B.

Then, it is determined in the first game apparatus 10A whether the game apparatus is a base unit or an extension unit, from the start point and the end point of the detected slide input. That is, the CPU 31A of the first game apparatus 10A, in the case where it is determined that the first start point 301A is located other than at the periphery of the first touch panel 3A and that the first end point 302A is located at the periphery of the first touch panel 3A (YES at step S303), determines that this first game apparatus 10A is a base unit, and transmits a beacon from the wireless communication module 35 (step S304).

It is also determined in the second game apparatus 10B whether the game apparatus is a base unit or an extension unit, from the start point and the end point of the detected slide input. That is, the CPU 31B of the second game apparatus 10B, in the case where it is determined that the second start point 301B is located at the periphery of the second touch panel 3B and that the second end point 302B is located other than at the periphery of the second touch panel 3B (NO at step S303), determines that this second game apparatus 10B is an extension unit, and waits for reception of the beacon from the base unit (step S305). When the beacon from the base unit is received, the second game apparatus 10B then transmits the calculated second vector V2 together with the identification number of the second game apparatus to the first game apparatus 10A.

Then, the first game apparatus 10A determines whether the orientation of the received second vector V2 coincides with the first vector V1. For example, after having aligned the orientations of both game apparatuses 10A and 10B, such that long sides of both game apparatuses 10A and 10B come in contact as shown in FIG. 16, it is determined whether the angle of the slide input that terminates at the periphery of the first touch panel 3A (first vector V1), and the angle of the slide input that begins from the periphery of the second touch panel 3B (second vector V2) roughly coincide. In the case where the orientations of both vectors V1 and V2 coincide (YES at step S306 or S307), pairing is then performed with the second game apparatus 10B as the extension unit. That is, the identification number of the second game apparatus 10B is stored in the internal storage medium 34 for data saving, and permission for communication is given to the second game apparatus 10B. Communication between both game apparatuses 10A and 10B is thus established, enabling transmission and reception of data (step S308 or S309).

On the other hand, in the first game apparatus 10A, in the case where it is determined that the orientation of the second vector V2 transmitted from the second game apparatus 10B does not coincide with the first vector V1 (NO at step S306 or S307), permission for communication is not given. That is, pairing of both game apparatuses 10A and 10B is not performed (step S310 or S311).

The above example shows an example in which the first game apparatus 10A serves as the base unit and the second game apparatus 10B serves as the extension unit, but in the case where, for example, the slide input is performed from the second touch panel 3B toward the first touch panel 3A, the second game apparatus 10B can serve as the base unit and the first game apparatus 10A can serve as the extension unit.

As abovementioned, pairing of both game apparatuses 10A and 10B can be performed simply by performing a slide input on both touch panels 3A and 3B. Also, since pairing is not performed unless the orientations of the calculated vectors coincide, unintentional pairing of game apparatuses can be avoided.

4-2

Although, in the above embodiment, the two game apparatuses 10A and 10B are paired and the positional relationship between these two game apparatuses is calculated, the positional relationship can also be calculated with three or more game apparatuses, for example.

Figure 20:
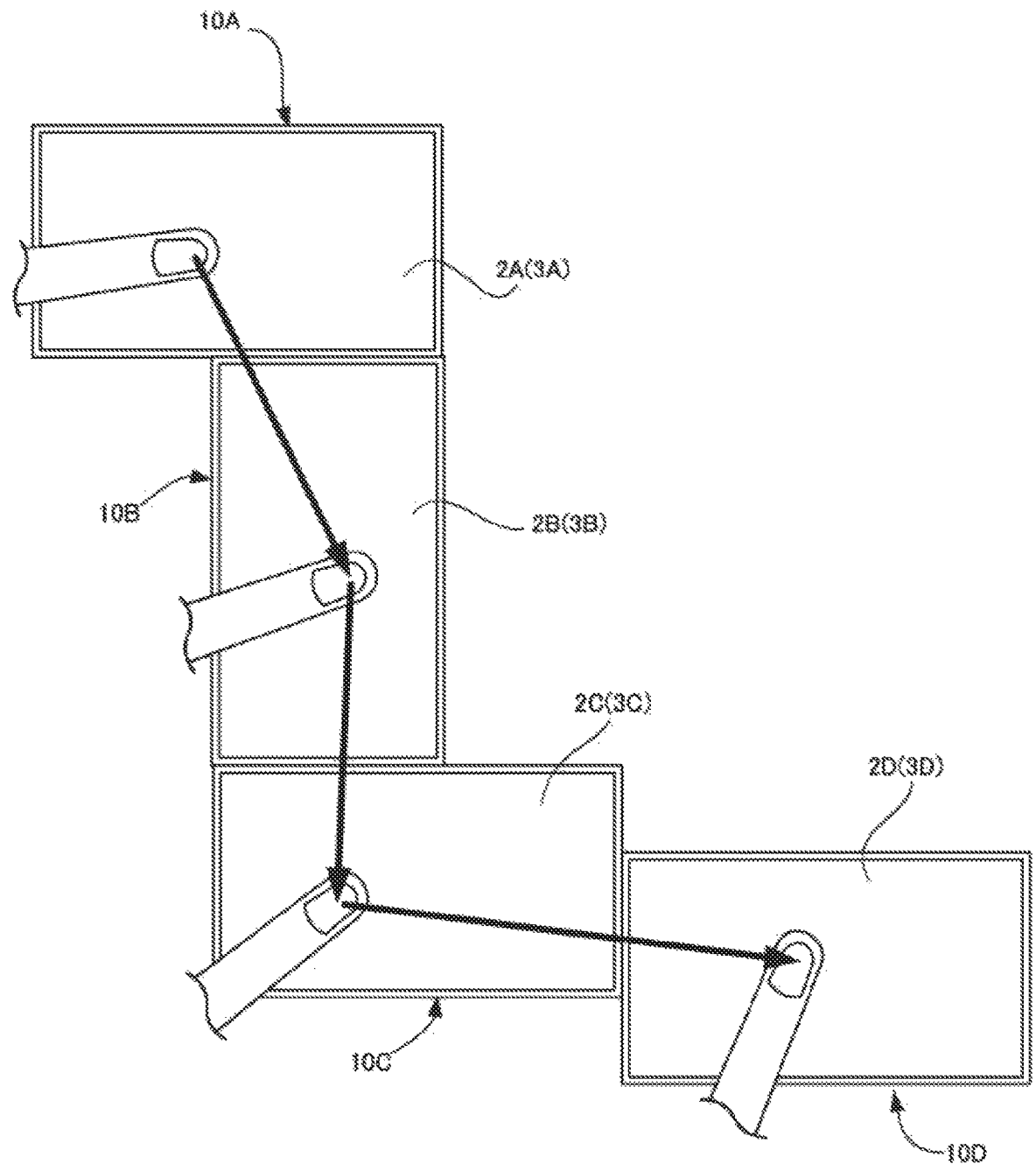
FIG. 20 is a plan view showing setting of the positional relationship in four game apparatuses.

For example, as shown in FIG. 20, four game apparatuses (first to fourth game apparatuses 10A to 10D) are provided, and the positional relationship of the four game apparatuses 10A to 10D can be calculated, even in the case where the player slides a finger from the touch panel 3A of the first game apparatus 10A, through the touch panels 3B and 3C of the second game apparatus 10B and the third game apparatus 10C, to touch panel 3D of the fourth game apparatus 10D in this order. That is, the positional relationship of the four game apparatuses 10A to 10D can be calculated, by respectively calculating the positional relationship of the first and second game apparatuses 10A and 10B, the positional relationship of the second and third game apparatuses 10B and 10C, and the positional relationship of the third and fourth game apparatuses 10C and 10D. Also, even if this is not the case, the positional relationship of the four game apparatuses 10A to 10D can be set, if at least three positional relationships are known.

Figure 21:
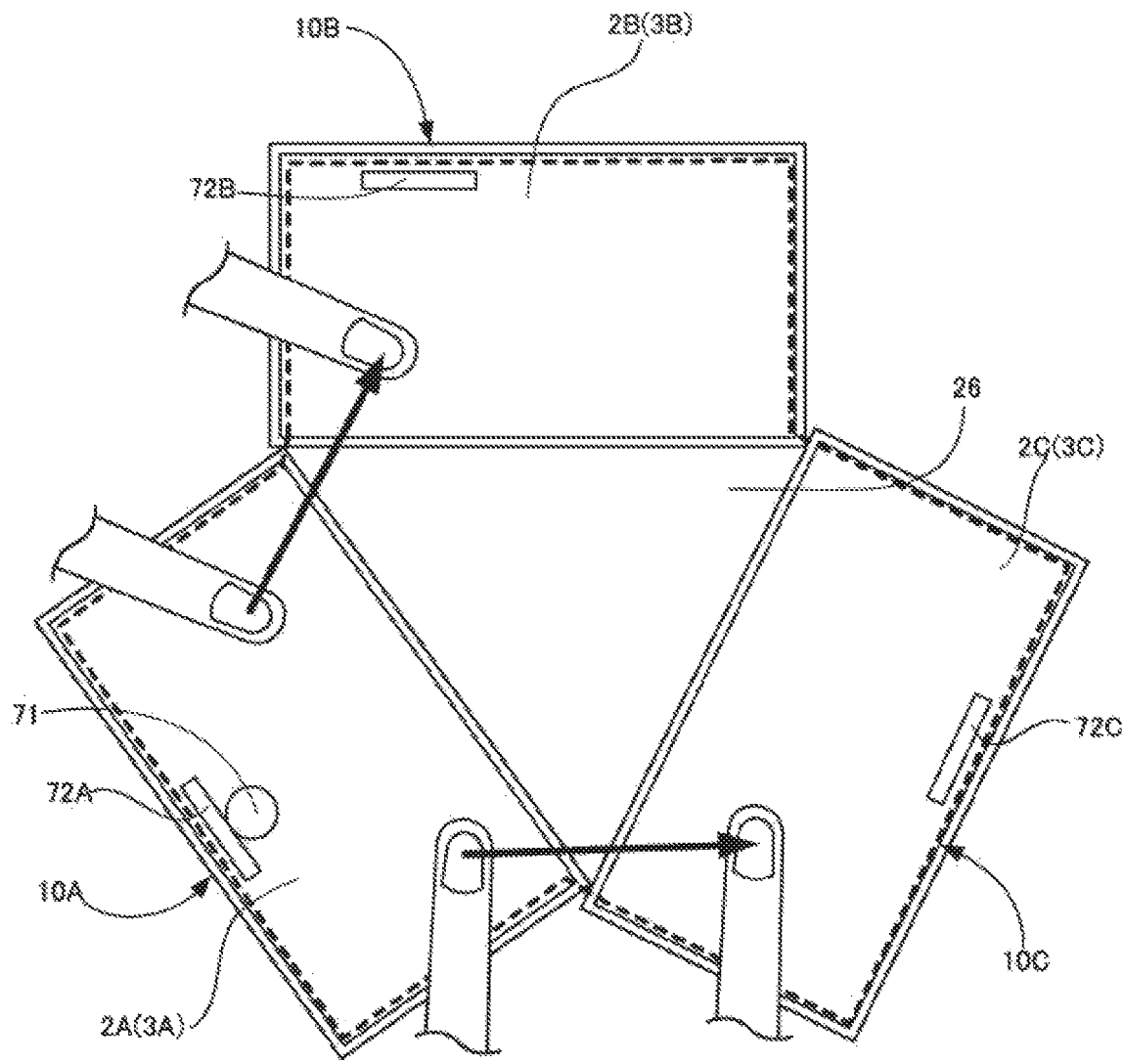
FIG. 21 is a plan view showing another example of the first exemplary game.

This will be described using the abovementioned games. For example, in the first exemplary game, three game apparatuses 10A to 10C are used, as shown in FIG. 21. The positional relationship of three game apparatuses 10A to 10C is set, in a state where the game apparatuses 10A to 10C are placed as shown in FIG. 21, by performing a slide input from the first touch panel 3A to the second touch panel 3B to calculate the positional relationship of these game apparatuses, and by further performing a slide input from the first touch panel 3A to the third touch panel 3C to calculate the positional relationship of these game apparatuses. The game space is then displayed on the LCDs 2A to 2C of the game apparatuses 10A to 10C, based on the positional relationship of these game apparatuses. Note that the positional relationship may be set by performing a slide input from the second touch panel 3B to the third touch panel 3C.

In the example of FIG. 21, a triangular space enclosed by the three LCDs 2A to 2C is added to these three LCDs 2A to 2C as the virtual space 26, and the game space (region enclosed with the broken line) is formed.

Figure 22:
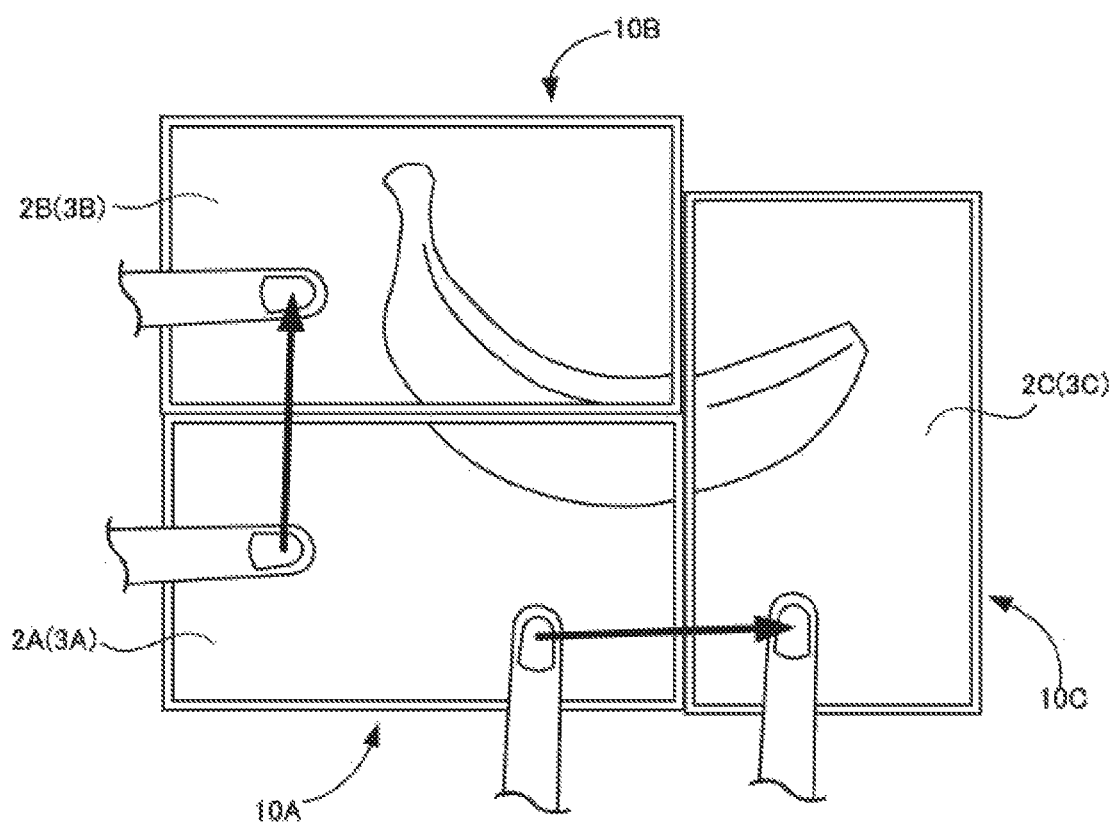
FIG. 22 is a plan view showing another example of the third exemplary game.
Figure 23:
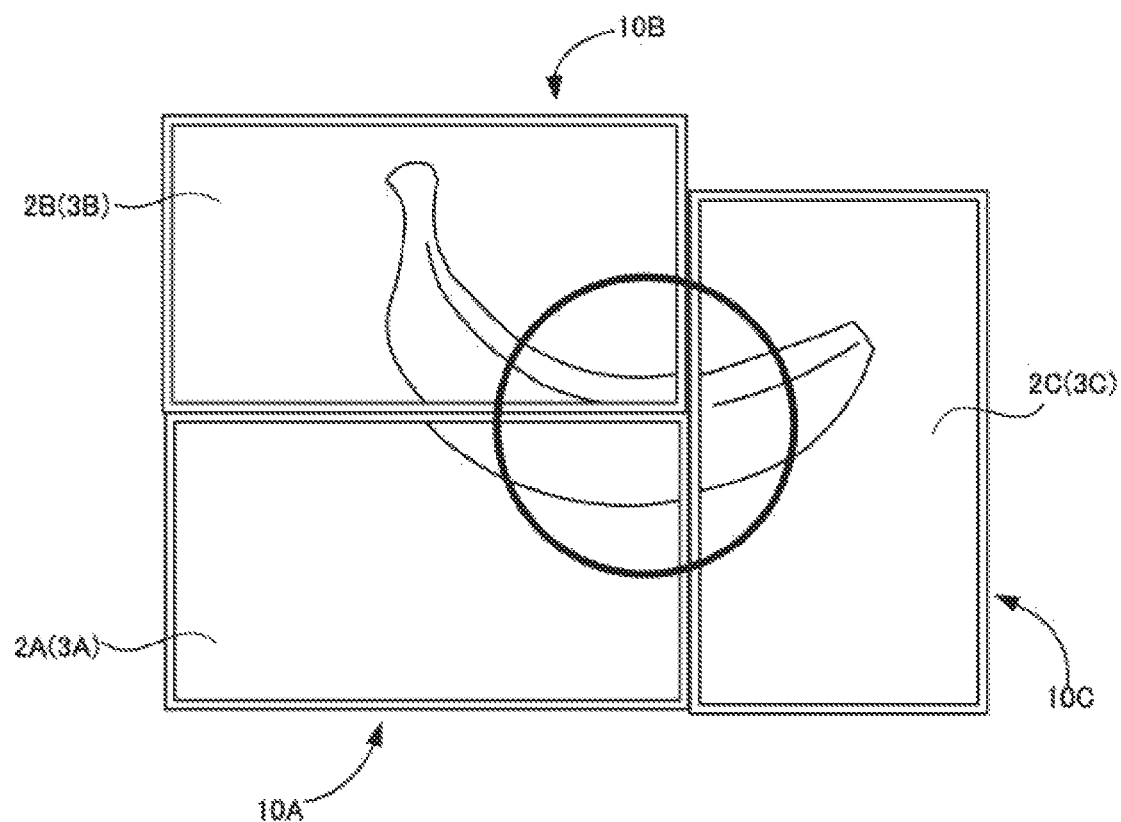
FIG. 23 is a plan view showing another example of the third exemplary game.

Also, in the third exemplary game, three game apparatuses 10A to 10C can be used, as shown in FIG. 22. That is, the image of the banana is divided in three, and a different one of the divided images is displayed on each of the LCDs 2A to 2C of the game apparatuses 10A to 10C. Thereafter, the player arranges the three game apparatuses 10A to 10C in the positional relationship that he or she considers to be appropriate, so as to appropriately unite the images of the divided banana. The positional relationship of the three game apparatuses is then calculated, by the player performing a slide input from the first touch panel 3A to the second touch panel 3B to calculate the positional relationship of these game apparatuses, and performing a slide input from the first touch panel 3A to the third touch panel 3C to calculate the positional relationship of these game apparatuses. If this positional relationship is correct, "0" is displayed so as to straddle the three LCDs 2A to 2C, as shown in FIG. 23. Note that the positional relationship may be calculated by performing a slide input from the second touch panel 3B to the third touch panel 3C.

Figure 24:
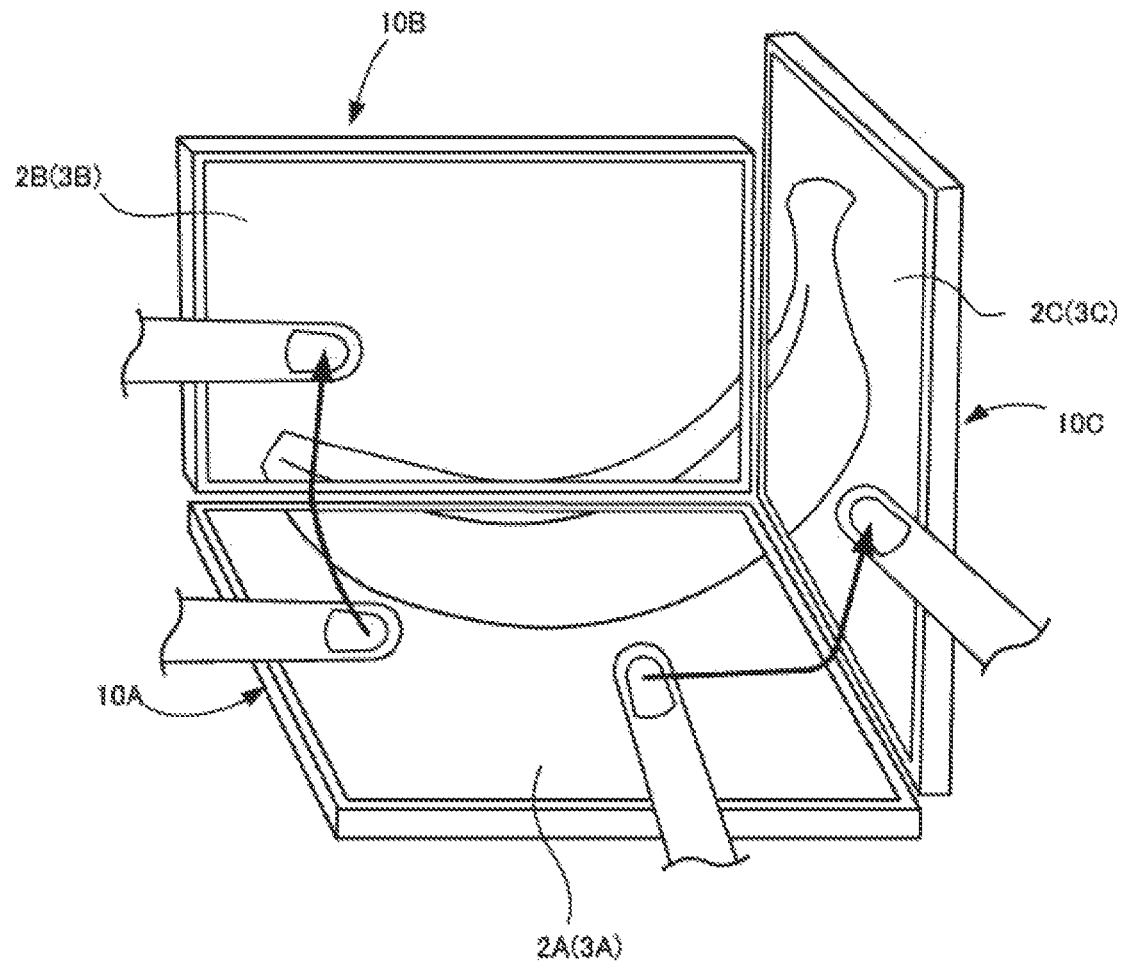
FIG. 24 is a plan view showing another example of the third exemplary game.

The game apparatuses 10A to 10C can also be arranged three-dimensionally. For example, the images can also be united by combining the three game apparatuses 10A to 10C three-dimensionally, as shown in FIG. 24. In this case, the positional relationship of three game apparatuses 10A to 10C is calculated, after having calculated the posture of the game apparatuses 10A to 10C based on the output values from the inertial sensors 36.

4-3

Figure 25:
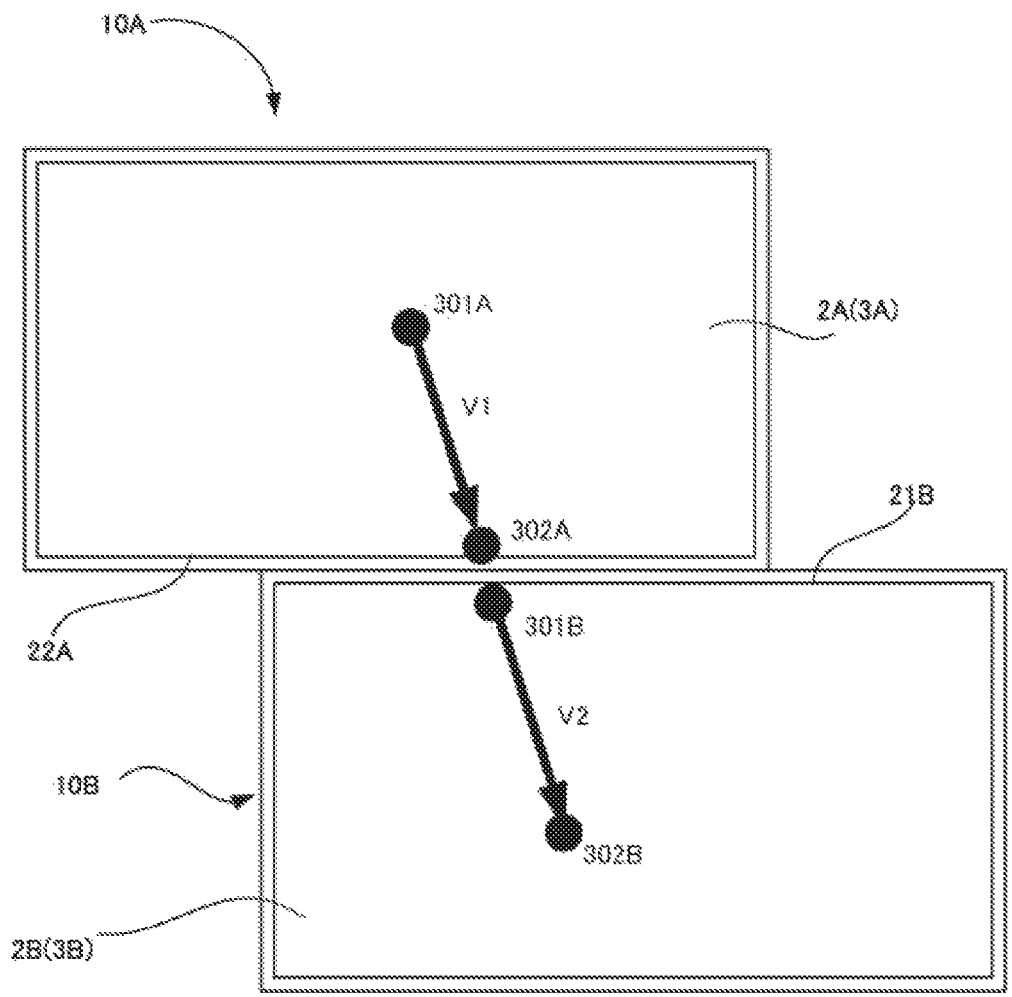
FIG. 25 is a plan view showing another example of setting the positional relationship with two game apparatuses.
Figure 26:
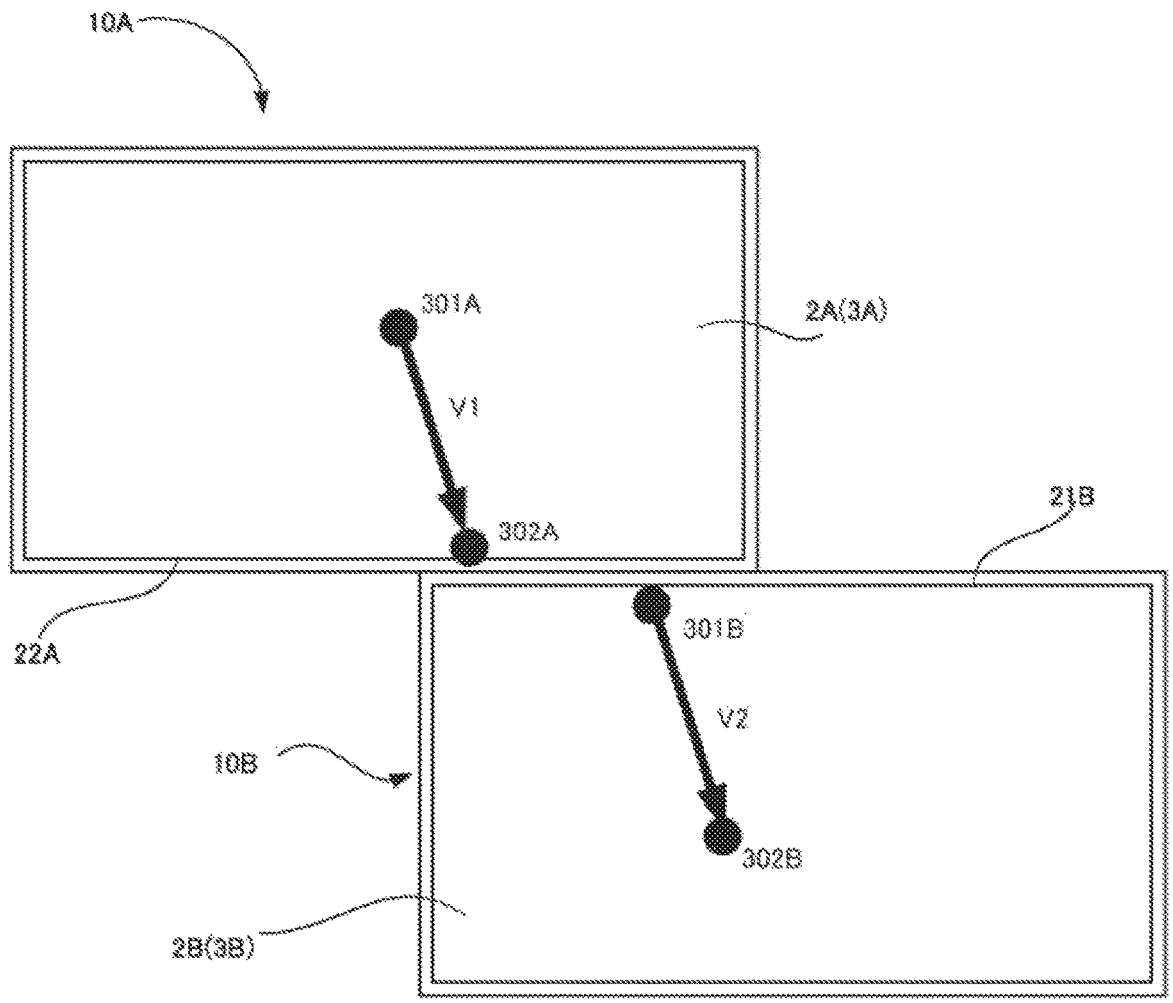
FIG. 26 is a plan view showing another example of setting the positional relationship with two game apparatuses.

In the above embodiment, the positional relationship of the first touch panel 3A and the second touch panel 3B is calculated such that the first end point 302A on the first touch panel 3A contacts the second start point 301B on the second touch panel 3B, but it is also possible to calculate only the sides that come in contact as the positional relationship. For example, in the example of FIG. 25, the second long side 22A of the first touch panel 3A and the first long side 21B of the second touch panel 3B are in contact, and it can be calculated which sides are in contact, rather than calculating how these long sides 22A and 21B are in contact, or in other words, in this example, the fact that both game apparatuses 10A and 10B are placed, such that the second long side 22A of the first touch panel 3A and the first long side 21B of the second touch panel 3B come in contact, can also be set as the positional relationship. Accordingly, the positional relationship set here also includes a positional relationship such as shown in FIG. 26, for example. By including such a positional relationship, in the third exemplary game, for example, the puzzle will be solved if any of the sides are adjacent, even if the sides are not adjacent at the precise position.

4-4

In the above embodiment, a configuration is adopted in which the first game apparatus 10A and the second game apparatus 10B mutually refer to calculated data using a frame synchronization method, but a configuration can also be adopted in which computation is performed in one of the game apparatuses. For example, it is also possible to transmit the coordinates of a touch position detected on the touch panel 3B of the second game apparatus 10B to the first game apparatus 10A, and to calculate the second vector V2 and the positional relationship in the first game apparatus 10A. Also, with regard to the posture of the second game apparatus 10B, it is possible to transmit the angular velocity detected by the inertial sensor 36 of the second game apparatus 10B to the first game apparatus 10A, and to calculate the posture of the second game apparatus 10B in the first game apparatus 10A. Conversely, the computations can also be performed by the second game apparatus 10B.

Furthermore, the computations can also be performed by a controller other than both game apparatuses 10A and 10B. That is, the coordinates of touch positions, slide speeds and the non-touch time detected in the game apparatuses 10A and 10B can be transmitted to the controller by wireless communication, and the vectors, positional relationship and the like can be calculated by the controller. The calculated positional relationship is then transmitted to the game apparatuses 10A and 10B. Thereafter, the game apparatuses 10A and 10B respectively display images for use in the game on the LCDs 2A and 2B, based on the received positional relationship. Note that the controller is not particularly limited as long as wireless communication with both game apparatuses 10A and 10B is possible and the positional relationship can be calculated, and a dedicated computer or a general-purpose computer can be used as the controller.

4-5

The wireless communication indicated in the above embodiment may utilize Bluetooth (registered trademark), for example, and the method of wireless communication is not particularly limited.

4-6

The slide input on the touch panels 3A and 3B need not necessarily be in a straight line. That is, even if the slide input is curved, a linear vector can be calculated from the start point and the end point of the slide input, or a vector can be calculated by approximating the curve to a straight line, for example.

4-7

Also, in the above embodiment, vectors are used in calculating the positional relationship, but even if this is not the case, the positional relationship of both touch panels 3A and 3B can be calculated, if the slide input from the first touch panel 3A toward the second touch panel 3B can be detected, and the slide input on the first touch panel 3A and the slide input on the second touch panel 3B can be calculated.

4-8

Figure 27:
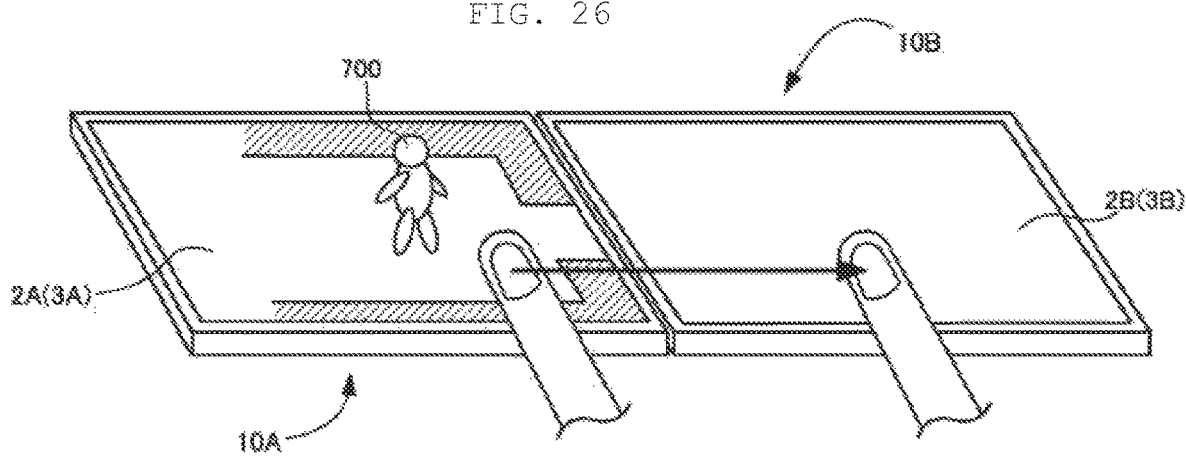
FIG. 27 is a perspective view showing another example of setting the positional relationship with two game apparatuses.
Figure 28:
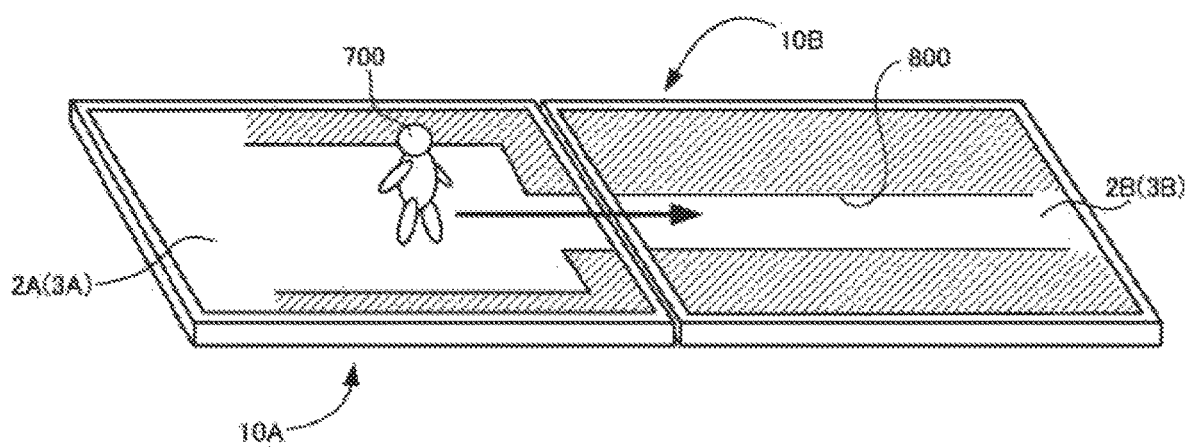
FIG. 28 is a perspective view showing another example of setting the positional relationship with two game apparatuses.

In the above embodiment, after setting the positional relationship, an image based on the set positional relationship is displayed on the LCDs of all the game apparatuses, but display based on the positional relationship need only be performed on at least one LCD. For example, a slide input is performed from the first touch panel 3A to the second touch panel 3B, after having placed the second game apparatus 10B adjacent to the short side of the first game apparatus 10A, when a movable person-like object 700 is displayed on the LCD 2A of the first game apparatus 10A, as shown in FIG. 27. The positional relationship of both game apparatuses 10A and 10B is thereby set, and a passage 800 through which the object 700 can move is displayed on the LCD 2B of the second game apparatus 10B, as shown in FIG. 28. An image based on the positional relationship thus need only be displayed on one of the LCDs, as a result of setting the positional relationship.

4-9

Although, in the above embodiment, an example was shown in which the information processing apparatus according to the present invention is applied to a game apparatus, the present invention is not limited thereto. That is, apart from a game apparatus, a computer that has a touch panel and a display unit such as an LCD can be used as the information processing apparatus of the present invention. Accordingly, a smartphone or the like can be used as the information processing apparatus, and a program for setting of the abovementioned positional relationship can be used in various types of computers such as a smartphone. Also, uses other than games are possible as long as the positional relationship of two apparatuses can be calculated and an image can be displayed based on the positional relationship.

REFERENCE SIGNS LIST

10A First game apparatus (first information processing apparatus)
10B Second game apparatus (second information processing apparatus)
2A First LCD (display unit)
2B Second LCD (display unit)
3A First touch panel
3B Second touch panel
31 Information processing unit (control unit)
35 Wireless communication module (communication unit)
36 Inertial sensor (sensor)

What is claimed:

1. A game system comprising:
a plurality of information processing apparatuses configured to communicate with each other, the plurality of information processing apparatuses including at least a first information processing apparatus and a second information processing apparatus; and
processing resources including at least one processor, the processing resources being configured to control the plurality of information processing apparatuses,
wherein the first information processing apparatus includes a first display and a first touch panel configured to detect contact on the first display,
wherein the second information processing apparatus includes a second display and a second touch panel configured to detect contact on the second display, and
wherein the processing resources are further configured to:
set, responsive to slide input from a first position on the first touch panel toward a second position on the second touch panel being detected, a positional relationship between the first display and the second display based on a first slide input on the first touch panel and a second slide input on the second touch panel, out of the slide input from the first position toward the second position, wherein game processing is performable based on the positional relationship,
calculate a distance between an end point of the first slide input and a start point of the second slide input, wherein the positional relationship of the first display and the second display is set as including a space, based on the calculated distance,
set a first display range and a second display range that are partial ranges within a shared virtual space, in correspondence with the positional relationship,
configure settings such that the first display range of the virtual space is displayed on the first display and the second display range of the virtual space is displayed on the second display, and
cause at least one of the first display and the second display to provide output based on the game processing.

2. The game system according to claim 1, wherein the processing resources are further configured to calculate a first vector corresponding to the first slide input on the first touch panel, calculate a second vector corresponding to the second slide input on the second touch panel, and set the positional relationship based on the first vector and the second vector.

3. The game system according to claim 2, wherein the processing resources are further configured to set the positional relationship as being such that the first vector and the second vector are arranged along a common line.

4. The game system according to claim 2, wherein the processing resources are further configured to:
calculate a distance between an end point of the first vector and a start point of the second vector, based on a time period between the first slide input and the second slide input and a speed of the slide input.

5. The game system according to claim 1, wherein:
at least one of the first information processing apparatus and the second information processing apparatus includes a sensor configured to detect an inclination of the apparatus, and
the processing resources are further configured to calculate the inclination of the apparatus(es) that include(s) the sensor(s) based on output therefrom, set a state of intersection of a display surface of the first display and a display surface of the second display based on the inclination, and cause at least one of the first display and the second display to provide output that depends on the state of intersection.

6. The game system according to claim 1, wherein the plurality of information processing apparatuses include a third information processing apparatus that has a third display, and
wherein the processing resources are further configured to set a positional relationship of the first display and the third display and/or a positional relationship of the second display and the third display, and cause at least one of the first display, the second display, and the third display to provide output that depends on at least one of the positional relationships.

7. The game system according to claim 1, wherein:
when slide input terminating at a periphery of the first touch panel is detected, the first information processing apparatus is determined to be a base unit and is configured to perform communication with an extension unit,
when slide input terminating other than at a periphery of the second touch panel is detected, the second information processing apparatus is determined to be an extension unit and is configured to perform communication with a base unit, and the first information processing apparatus and the second information processing apparatuses are configured to enter a mutually communicable state, in a case where the first information processing apparatus is determined to be the base unit and the second information processing apparatus is determined to be the extension unit, and an orientation of the first slide input on the first touch panel coincides with an orientation of the second slide input on the second touch panel.

8. A game method using a first information processing apparatus having a first display and a first touch panel configured to detect contact on the first display, and a second information processing apparatus having a second display and a second touch panel configured to detect contact on the second display, the second information processing apparatus being communicable with the first information processing apparatus, the method comprising:

setting a positional relationship of the first display and the second display, based on a first slide input on the first touch panel and a second slide input on the second touch panel, the first slide input originating from a first position on the first touch panel and moving toward a second position on the second touch panel;

calculating a distance between an end point of the first slide input and a start point of the second slide input, wherein the positional relationship of the first display and the second display is set as including a space, based on the calculated distance;

setting a first display range and a second display range that are partial ranges within a shared virtual space, in correspondence with the positional relationship;

configuring settings such that the first display range of the virtual space is displayed on the first display and the second display range of the virtual space is displayed on the second display;

performing game processing based on the positional relationship; and causing at least one of the first display and the second display to display output based on the game processing.

9. The game method according to claim 8, wherein the positional relationship specifies how the first display and second display are oriented relative to one another.

10. The game method according to claim 8, further comprising:

setting the positional relationship such that the first and second slide inputs are arranged along a common line.

11. The game method according to claim 8, further comprising:

setting a state of intersection of a display surface of the first display and a display surface of the second display, based on an inclination defined between the first and second displays, and causing at least one of the first display and the second display to display output in accordance with the state of intersection.

12. An information processing apparatus, comprising:
a display;
a touch panel configured to detect contact on the display;
at least one processor; and
a transceiver;
wherein the information processing apparatus is configured to communicate with another apparatus having a display and touch panel; and
wherein when slide input from a first position on the touch panel of the information processing apparatus toward a second position on the touch panel of the another apparatus is detected, based on touch information detected by the touch panel of the information processing apparatus and the touch panel of the another apparatus, the at least one processor is configured to control the information processing apparatus to:

acquire, from the another apparatus via the transceiver, information indicative of information indicative of a second slide input on the touch panel of the another apparatus, set a positional relationship specifying how the display of the information processing apparatus and the display of the another apparatus are oriented relative to one another, based on the second slide input and a first slide input on the touch panel of the information processing apparatus, calculate a distance between an end point of the first slide input and a start point of the second slide input, wherein the positional relationship is set as including a space, based on the calculated distance, set a first display range and a second display range that are partial ranges within a shared virtual space, in correspondence with the positional relationship, configure settings such that the first display range of the virtual space is displayed on the display of the information processing apparatus and the second display range of the virtual space is displayed on the display of the another apparatus, perform game processing based on the positional relationship, and cause at least one of the display of the information processing apparatus and the display of the another apparatus to display output based on the game processing.

13. The information processing apparatus of claim 12, wherein the positional relationship indicates that the display of the information processing apparatus and the display of the another apparatus are physically spaced apart from one another in response to a determination that an end of the first slide input is spaced apart from a beginning of the second slide input.

14. The information processing apparatus of claim 12, wherein the at least one processor is further configured to control the information processing apparatus to:

set a state of intersection of display surfaces of the display of the information processing apparatus and the display of the another apparatus, based on an inclination therebetween, and cause at least one of the display of the information processing apparatus and the display of the another apparatus to display output in accordance with the state of intersection.

15. An information processing apparatus, comprising:
a display;
a touch panel configured to detect contact on the display;
at least one processor; and
a transceiver;
wherein the information processing apparatus is configured to communicate with another apparatus having a display and touch panel; and
wherein when slide input from a first position on the touch panel of the another apparatus toward a second position on the touch panel of the information processing apparatus is detected, based on touch information detected by the touch panel of the another apparatus and the touch panel of the information processing apparatus, the at least one processor is configured to control the information processing apparatus to:

acquire, from the another apparatus via the transceiver, information indicative of a first slide input on the touch panel of the another apparatus, set a positional relationship specifying how the display of the information processing apparatus and the display of the another apparatus are oriented relative to one another, based on the first slide input and a second slide input on the touch panel of the information processing apparatus, calculate a distance between an end point of the first slide input and a start point of the second slide input, wherein the positional relationship is set as including a space, based on the calculated distance, set a first display range and a second display range that are partial ranges within a shared virtual space, in correspondence with the positional relationship, configure settings such that the first display range of the virtual space is displayed on the display of the information processing apparatus and the second display range of the virtual space is displayed on the display of the another apparatus, perform game processing based on the positional relationship, and cause at least one of the display of the information processing apparatus and the display of the another apparatus to display output based on the game processing.

16. The information processing apparatus of claim 15, wherein the positional relationship indicates that the display of the information processing apparatus and the display of the another apparatus are physically spaced apart from one another in response to a determination that an end of the first slide input is spaced apart from a beginning of the second slide input.

17. The information processing apparatus of claim 15, wherein the at least one processor is further configured to control the information processing apparatus to:

set a state of intersection of display surfaces of the display of the information processing apparatus and the display of the another apparatus, based on an inclination therebetween, and cause at least one of the display of the information processing apparatus and the display of the another apparatus to display output in accordance with the state of intersection.

18. A non-transitory computer readable storage medium storing a game program for causing a computer of an information processing apparatus having a display and a touch panel configured to detect contact, and capable of communicating with another apparatus having a display and a touch panel configured to detect contact to execute functionality comprising:

when slide input from a first position on the touch panel of the information processing apparatus toward a second position on the touch panel of the another apparatus is detected, based on touch information detected by the touch panel of the information processing apparatus and the touch panel of the another apparatus, acquiring, from the another apparatus, information indicative of a second slide input on the touch panel of the another apparatus, out of the slide input from the first position toward the second position;

setting a positional relationship between the display of the information processing apparatus and the display of the another apparatus, based on the second slide input and a first slide input on the touch panel of the information processing apparatus, out of the slide input;

calculating a distance between an end point of the first slide input and a start point of the second slide input, wherein the positional relationship is set as including a space, based on the calculated distance;

setting a first display range and a second display range that are partial ranges within a shared virtual space, in correspondence with the positional relationship;

configuring settings such that the first display range of the virtual space is displayed on the display of the information processing apparatus and the second display range of the virtual space is displayed on the display of the another apparatus;

performing game processing based on the positional relationship; and causing at least one of the display of the information processing apparatus and the display of the another apparatus to display output based on the game processing.

19. The non-transitory computer readable storage medium according to claim 18, wherein the positional relationship specifies how the display of the information processing apparatus and the display of the another apparatus are oriented relative to one another.

20. The non-transitory computer readable storage medium according to claim 18, wherein:

the positional relationship is set such that the first and second slide inputs are arranged along a common line.

21. A non-transitory computer readable storage medium storing a game program for causing a computer of an information processing apparatus having a display and a touch panel configured to detect contact, and capable of communicating with another apparatus having a display and a touch panel configured to detect contact to execute functionality comprising:

when slide input from a first position on the touch panel of the another apparatus toward a second position on the touch panel of the information processing apparatus is detected, based on touch information detected by the touch panel of the another apparatus and the touch panel of the information processing apparatus, acquiring, from the another apparatus, information indicative of a first slide input on the touch panel of the another apparatus, out of the slide input from the first position toward the second position;

setting a positional relationship between the display of the information processing apparatus and the display of the another apparatus, based on the first slide input and a second slide input on the touch panel of the information processing apparatus, out of the slide input;

calculating a distance between an end point of the first slide input and a start point of the second slide input, wherein the positional relationship is set as including a space, based on the calculated distance;

setting a first display range and a second display range that are partial ranges within a shared virtual space, in correspondence with the positional relationship;

configuring settings such that the first display range of the virtual space is displayed on the display of the information processing apparatus and the second display range of the virtual space is displayed on the display of the another apparatus;

performing game processing based on the positional relationship; and causing at least one of the display of the information processing apparatus and the display of the another apparatus to perform display based on the game processing.

22. The non-transitory computer readable storage medium according to claim 21, wherein the positional relationship specifies how the display of the information processing apparatus and the display of the another apparatus are oriented relative to one another.

23. The non-transitory computer readable storage medium according to claim 21, wherein:
the positional relationship is set such that the first and second slide inputs are arranged along a common line.

24. The game system according to claim 1, wherein the information processing apparatus are physically-separated independently-operable electronic devices, each having their own processors.

25. The game system according to claim 1, wherein the positional relationship is set as a part of a pre-gameplay setup procedure.

26. The game system according to claim 1, wherein the positional relationship is dynamically settable.

* * * * *